United States Patent Office 3,655,619
Patented Apr. 11, 1972

3,655,619
ALKOXYLATED MANNICH BASE URETHANE PREPOLYMER COMPOSITION AND METHOD OF PREPARATION
Lucien Sellet, Saddle River, N.J., assignor to Diamond Alkali Company
No Drawing. Original application Aug. 22, 1966, Ser. No. 573,789. Divided and this application Jan. 24, 1969, Ser. No. 807,154
Int. Cl. C08g 22/08
U.S. Cl. 260—47 CB 2 Claims

ABSTRACT OF THE DISCLOSURE

Treating agents which are the reaction product of an hydroxyl containing nitrogen compound, an isocyanate terminated urethane prepolymer and an acid or quaternizing agent, said reaction products being useful in the treatment of fibrous, porous and nonporous substrates.

This application is a divisional application of Ser. No. 573,789, Sellet, filed Aug. 22, 1966.

The present invention relates to novel treating agents, which are (a) hydroxyl containing nitrogen compounds, (b) reaction products of hydroxyl containing nitrogen compounds with acids or quaternizing agents, (c) reaction products of hydroxyl containing nitrogen compounds and isocyanate terminated urethane prepolymers or (d) reaction products of hydroxyl containing nitrogen compounds, isocyanate terminated urethane prepolymers with acids or quaternizing agents and their utilization in the treatment of fibrous, porous and nonporous substrates.

It is an object of the present invention to provide for novel treating agents, especially for fibrous, porous and nonporous substrates. Such novel treating agents include hydroxyl containing nitrogen compounds as well as their reaction products with isocyanate terminated urethane prepolymers obtained by reaction of polyethers such as polyoxyalkylene polyols, polyols such as alkylene polyols and polyesters having at least two terminal hydroxyl groups with polyisocyanates. A further object is to provide for novel treating agents which are acid addition or quaternary ammonium salts of the hydroxyl containing nitrogen compounds or their reaction products with isocyanate terminated urethane prepolymers. Still another object is to provide for novel treating agents which when utilized in connection with fibrous, porous or nonporous substrates bring about enhanced properties of such substrates. Another object is to provide procedures for preparing these novel treating agents. A still further object is to provide for improved leather, paper, glass, plastic, rubber, wood and textile treating agents which impart improved properties when applied to said substrates in such diverse operations as tanning, retanning, dyestuff and pigment binding, dyeing, dispersing, coating and finishing, as well as in applications where treating agent properties such as dispersibility, dyeability, elongation, flexibility, adhesion, antistatic, abrasion resistance, bonding and the like are desired. Other objects will become apparent from the detailed description given hereinafter. It is intended, however, that the detailed description and specific examples do not limit the invention but merely indicate preferred embodiments thereof since changes and modifications within the scope of this invention will become apparent to those skilled in the art.

The above as well as other objects have been unexpectedly and successfully achieved in the following manner. I have prepared and utilized in the treatment of various fibrous, porous and nonporous substrates such as films, sheets, solids, fibers and like materials, treating agents which can be broadly described as hydroxyl containing nitrogen compounds which are the alkoxylation products of polyhydroxy compounds containing methylenic alkanolamine radical substituents such as those obtained when carrying out the Mannich reaction using aryl hydroxy compounds, aldehydes or aldehyde liberating compositions and alkanolamines. Likewise I have also prepared treating agents, which are the reaction products of the above-described hydroxyl containing nitrogen compounds and isocyanate terminated urethane prepolymers. Also I have prepared and used as treating agents, addition salts and quaternary ammonium salts of both (a) the hydroxyl containing nitrogen compounds and (b) their reaction products with isocyanate terminated urethane prepolymers. By the term isocyanate terminated urethane prepolymer is meant those products obtained by reaction of polyethers such as polyoxyalkylene polyols, polyols such as alkylene polyols and polyesters having at least two terminal hydroxyl groups with organic polyisocyanates. Such isocyanate prepolymers are isocyanate terminated urethane prepolymers, i.e., the sole reactive groups in the prepolymer are isocyanate groups. By the term polyether is meant polyoxyalkylene polyols containing at least two terminal hydroxyl groups. By the term polyols is meant alkylene polyols containing at least two terminal hydroxyl groups. By the term polyester is meant the reaction products of polycarboxylic acids or their anhydrides with polyoxyalkylene polyols or alkylene polyols wherein the reaction products contain at least two terminal hydroxyl groups.

The treating agents of the present invention include hydroxy containing nitrogen compounds which are alkoxylated derivatives of Mannich Base compounds. Such Mannich Base compounds are the reaction products of (1) a phenol having at least one reactive hydrogen atom present in the phenol nucleus, (2) at least one aldehyde or aldehyde liberating composition and (3) at least one alkanolamine such as a monoalkanolamine or dialkanolamine wherein the alkylene group contains at least two carbon atoms. The (2) aldehyde or aldehyde liberating composition and (3) alkanolamine are present in approximately equimolar amounts with respect to each other. Further, there is present one mole of the (2) aldehyde or aldehyde composition and one mole of (3) alkanolamine for each reacting reactive hydrogen atom present in the phenol nucleus. By reacting reactive hydrogen hydrogen atoms present in the phenol nucleus is meant the number of reactive hydrogen atoms in the phenol nucleus which are chosen for reaction with aldehyde and alkanolamine in the Mannich reaction. For example, phenol has three reactive hydrogen atoms. One may choose to react one, two or three of these reactive hydrogen atoms by the Mannich reaction. The phenol nucleus in a 2,4- or 2,6- disubstituted phenol has only one reactive hydrogen atom so one can only choose to react the only reactive hydrogen. The phenol nucleus in a complex phenol such as a novolak may contain $n$ reactive hydrogen atoms so one can choose to react from one to $n$ reactive hydrogen atoms in the phenol nucleus. The manner in which a reactive hydrogen atom in the phenol can be reacted can be varied. For example, a reactive hydrogen atom in the alkanolamine can be reacted with the aldehyde and the resulting reaction product then can be reacted with the reactive hydrogen atom in the phenol nucleus. The reactive hydrogen atom in the phenol nucleus can be reacted with the aldehyde or aldehyde composition to obtain an alkylolated phenol which can then be reacted with a reactive hydrogen atom in the alkanolamine. The phenol, alkanolamine and aldehyde or aldehyde composition can be combined and reacted in one step. The order in which the phenol, alkanolamine and aldehyde or aldehyde composition are reacted in the Mannich reaction is determined by factors such as convenience, properties of the reactants, properties desired in the Mannich Base compound or the like.

The hydroxyl containing nitrogen compounds described above can be used as a treating agent itself or can be modified to produce other types of treating agents. For example, hydroxyl containing nitrogen compounds can be reacted with isocyanate terminated urethane prepolymers to produce treating agents which contain urethane linkages. Preparation of such treating agents involves reaction of reactive isocyanate groups with hydroxyl groups present in the hydroxyl containing nitrogen compounds. Furthermore such treating agents, e.g., the hydroxyl containing nitrogen compounds as well as their reaction products with isocyanate terminated urethane prepolymers can be reacted with acids or quaternizing reagents to produce treating agents. Reaction of the acid or quaternizing reagent is with the nitrogen atoms present in the treating agent. The acid or quaternizing reagent is employed in an amount sufficient to react with at least one of the nitrogen atoms present in the treating agent. When desired, all of the nitrogen atoms in the treating agent can be converted to acid addition salts or quaternary nitrogen atoms by employing sufficient acid or quaternizing reagent. The foregoing treating agents as well as processes for their manufacture and their uses are described in greater detail below.

These novel treating agents have outstanding properties which are in part attributed to the hydroxyl containing nitrogen compounds. Such hydroxyl containing nitrogen compounds can be obtained by alkoxylation of the Mannich reaction products of aryl hydroxyl compounds such as phenols with aldehydes and alkanolamines so as to provide for at least one alkoxylated substituent for each phenolic hydroxyl group present in Mannish Base compound, i.e., there may optionally be additional alkoxylated substituents on such hydroxyl group and also one or more on each alkanol group present in the alkanolamine radical substituents attached to the alkoxylated phenolic nucleus. These hydroxyl containing nitrogen compounds are described below in the section entitled Hydroxyl Containing Nitrogen Compounds. Hydroxyl containing nitrogen compounds useful in the present invention include alkoxylated phenols having at least one methylenic dialkanolamine radical substituent, methylenic oxyalkylated dialkanolamine radical substituent, methylenic monoalkanolamine radical substituent or methylenic oxyalkylated monoalkanolamine radical substituent attached to the alkoxylated phenolic nucleus. Useful alkoxylated phenols include alkoxylated alkylphenols, alkoxylated polynuclear phenols, alkoxylated phenyl phenols, alkoxylated phenols linked by alkylene bridges, alkoxylated fused phenols and the like having at least one alkoxylated phenolic hydroxyl group and at least one methylenic alkanolamine substituent or at least one oxyalkylated methylenic alkanolamine radical substituent. It is to be understood that mixtures of the above-mentioned hydroxyl containing nitrogen compounds can be used in the preparation of the treating agents disclosed in this invention. Treating agents can also be prepared by reaction of isocyanate terminated urethane prepolymers with these hydroxyl containing nitrogen compounds and by quaternization of the reaction products of these hydroxyl containing nitrogen compounds and isocyanate terminated urethane prepolymers or by addition of acids to these reaction products to form salts. Further, treating agents can be prepared by quaternization of the hydroxyl containing nitrogen compounds themselves or by addition of acids to form salts.

These treating agents are unique in that they are not sensitive to water and can be applied from aqueous solutions or dispersions. A further advantage of these treating agents is that they can be prepared in the form of quaternary ammonium salts or acid addition salts and applied to substrates in the form of solutions or dispersions. The treating agents may be used directly or in the form of their salts or quaternaries. They may be formulated with acids, surfactants, solvents and the like to obtain formulations for applications where specific requirements such as water-solubility, solvent solubility, dispersibility or the like are required.

Since the treating agents enhance properties such as film forming, coating, dyeability, dispersibility, adhesion, abrasion resistance, washfastness, antistatic, light stability and other properties as well as acting as carriers and/or binders for pigments and dyestuffs, it is a definite advantage to be able to vary the nature and the properties of the hydroxyl containing nitrogen compounds employed as treating agents and in the preparation of the treating agents disclosed in this invention as described hereinafter.

HYDROXYL CONTAINING NITROGEN COMPOUNDS

The hydroxyl containing nitrogen compounds useful in the present invention are prepared by reacting (a) at least one mole of an alkylene oxide or mixtures thereof wherein each alkylene group in the oxide contains from two to 57 carbon atoms with (b) at least each phenolic hydroxyl group present in an aromatic Mannich Base compound having at least one phenolic hydroxyl group and at least one methylenic alkanolamine radical substituent attached to an aromatic ring present in the Mannich Base compound. Reaction of alkylene oxide with the phenolic hydroxyl groups in the Mannich Base compounds converts these groups to hydroxyalkyl phenoxy groups. When more than one mole of alkylene oxide per each phenolic hydroxyl group present in the aromatic Mannich Base compound is employed, the additional alkylene oxide reacts with the hydroxyalkyl phenoxy groups as well as the alkanol groups of the methylenic alkanolamine radical substituents present in the Mannich Base compound. Thus, the hydroxyl groups present in the hydroxyl containing nitrogen compound can contain alkylene oxide or polyoxyalkylene chains.

Aromatic Mannich Base compounds useful in preparing the abovementioned hydroxyl containing nitrogen compounds can be obtained by the Mannich reaction. The Mannich reaction has been described generally above and is described in greater detail below. Preparation of Mannich Base compounds can be achieved by the methods described below as well as the methods given in U.S. Pat. No. 2,033,092, Bruson, Mar. 3, 1936; U.S. Pat. No. 2,114,-122, Bruson, Apr. 12, 1938 and U.S. Pat. No. 2,220,834, Bruson et al., Nov. 5, 1940. Formulas I to V inclusive illustrate the types of Mannich Base compounds obtained when from one to three moles of formaldehyde and from one to three moles of diethanolamine, present in approximately equimolar amounts with respect to each other, are condensed with one mole of phenol. For example, condensation of one mole of formaldehyde and one mole of diethanolamine with one mole of phenol yields nitrogen compounds of the type shown in Formulas I and II.

(I) 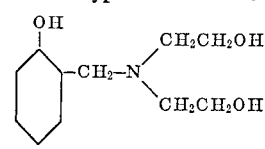

and (II) 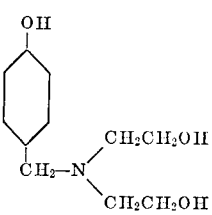

Likewise, when two moles of formaldehyde and two moles of diethanolamine are condensed with one mole of phenol, Mannich Base compounds of the types shown in Formulas III and IV are obtained.

(III) 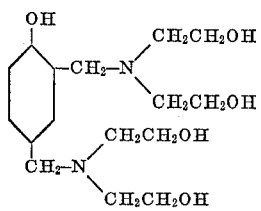

and (IV) 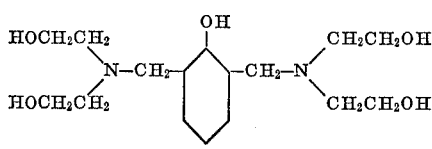

When three moles of formaldehyde and three moles of diethanolamine present in equimolar amounts are condensed with one mole of phenol, the Mannich Base compound shown in Formula V is obtained.

(V) 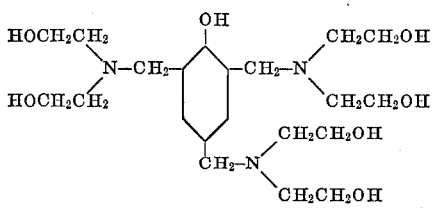

Formulas I to V inclusive illustrate various type of Mannich Base compounds obtained in the Mannich reaction of formaldehyde and diethanolamine with phenol. It is of course understood that, in practice, the Mannich Base compounds are not necessarily obtained in pure form, but quite often are obtained as mixtures of compounds with one particular type predominating. Further, it is to be understood that the above and subsequent structural formulas are set forth herein to facilitate an understanding of the present invention. They are not, however, to be construed as limiting the present invention to their precise structures.

Similar Mannich Base compounds are obtained when monoethanolamine, N-methyl monoethanolamine or N-ethyl monoethanolamine is substituted for diethanolamine in the Mannich reaction. Likewise alkanolamines such as dipropanolamines, monopropanolamines, N - alkyl monopropanolamines, dibutanolamines, monobutanolamines, N-alkyl monobutanolamines, monohexanolamine, monododecanolamine, their isomers and higher homologoues or the like can be substituted for diethanolamine, e.g., diisopropanolamine.

Aldehydes or aldehyde compositions which provide aldehydes containing from one to seven carbon atoms can be used in the Mannich reaction. For example, formaldehyde can be used in the form of 30 to 40% aqueous solutions, 30 to 55% alcohol solutions with alcohols such as methanol, n-butanol, i-butanol or the like. Formaldehyde can also be used in any of its polymeric forms such as paraformaldehyde, trioxane, hexamethylene tetramine or the like. Other aldehydes such as acetaldehyde, butyraldehyde, heptaldehyde, furfuraldehyde, chloral, alpha-ethyl-beta-propylacrolein, benzaldehyde or the like can be substituted for formaldehyde in the Mannich reaction. Aldehyde compositions such as acetals which liberate such aldehydes can also be employed. Such aldehyde compositions may also include aldehyde and hydrogen chloride mixtures wherein the phenol is chloromethylated and then reacted with alkanolamine to obtain Mannich Base compounds.

Phenols such as alkylphenols, polynuclear phenols, polyphenyl phenols, phenols linked by alkylene bridges (novolaks), fused phenols and the like having at least one free phenolic hydroxyl group and at least one reactive hydrogen in the phenolic nucleus can be substituted for phenol in the Mannich reaction.

Mannich Base compounds similar to those shown in Formula I to V inclusive can be prepared from 3-alkylphenols such as 3-methylphenol (m-cresol), 3-n-pentadecyl phenol, their isomers, homologues, mixtures, and the like by condensing one mole of 3-alkylphenol with from one to three moles of an aldehyde and from one to three moles of alkanolamine, the aldehyde and alkanolamine being present in approximately equimolar amounts with respect to each other.

Other useful Mannich Base compounds can be prepared from 2-alkylphenols, 4-alkylphenols, 2,4-dialkylphenols and 2,6-dialkylphenols by use of the Mannich reaction. For example, 2-alkylphenols and 4-alkylphenols can be reacted with from one to two moles of an aldehyde and from one to two moles of diethanolamine, the aldehyde and alkanolamine being present in approximately equimolar amounts with respect to each other, to obtain Mannich Base compounds having from one to two methylenic diethanolamine radicals. 2-alkylphenols which can be used in the preparation of Mannich Base compounds include 2-methylphenol, 2-ethylphenol, 2-n-propylphenol, 2-i-propylphenol, 2-n-butylphenol, 2-t-butylphenol, 2-n-pentylphenol, 2-n-hexylphenol, 2-n-heptylphenol, 2-n-octylphenol, 2-t-octylphenol, 2-n-nonylphenol, 2-i-nonylphenol, 2-n-decylphenol, 2-n-dodecylphenol, 2-n-tridecylphenol, 2 - n - tetradecylphenol, 2-n-pentadecylphenol, 2-n-hexadecylphenol, 2-n-octadecylphenol, 2-n-nonadecylphenol, 2-n-eicosylphenol, 2-n-docosylphenol, 2-n-triacontylphenol, their isomers, their mixtures and the like. The corresponding 4-n-alkylphenols, their isomers, their mixtures and the like can also be employed. Such monoalkylphenols are well known in the art, particularly, those containing branched substituents and are used extensively in the manufacture of surfactants, antioxidants and the like. Many of these alkylphenols can be prepared by alkylation of phenol with olefins containing from the to thirty carbon atoms. Usually alkylation procedures produce mixtures of 2- and 4-alkylphenols. Alkylphenols can be used in the form of these mixtures or the 2-alkylphenols can be separated from the 4-alkylphenols by distillation or other methods and used individually.

The corresponding 2,4-dialkylphenols and 2,6-dialkylphenols can be produced by alkylation methods similar to those described above, that is, by reaction of one mole of phenol with two moles of olefin containing from three to thirty carbon atoms and employed in the Mannich reaction. It is to be understood that dialkylphenols having dissimilar alkyl groups can be employed. For example, dialklyphenols such as 2-methyl-4-nonylphenol and 2-octyl-4-methylphenol can be used. Such phenols can be obtained by alkylation of the corresponding methylphenols. Dialkylphenols obtained by these alkylation methods can also be used as mixtures or the desired 2,4-alkylphenols may be separated from the 2,6-dialkylphenols and used individually. Such dialkylphenols contain only one reactive hydrogen atom and can react with only one mole of alkanolamine and one mole of aldehyde or aldehyde composition in the Mannich reaction.

It is to be understood that olefins employed in the preparation of the above alkylphenols can be either linear or branched chain olefins and that mixtures of such olefins can be used. Generally, α-olefins are preferred because of their high reactivity. Linear olefins obtained by the reaction of ethylene with metal alkyls such as the Ziegler type compounds or those obtained in the wax cracking of fats are particularly useful in the preparation of alkylphenols.

Other phenols useful in the Mannich reaction include o-phenylphenol and p-phenylphenol as well as phenols linked to aromatic groups by alkylene bridges such as those in α-methylbenzyl-o-phenol and α-dimethylbenzyl-o-phenol. These phenols can be alkylated to produce other types of phenols which are useful in the Mannich reaction. Formula VI illustrates a Mannich Base compound obtained by the reaction of one mole of α-methylbenzyl-o-phenol, one mole of formaldehyde and one mole of diethanolamine which is useful as a hydroxyl containing nitrogen compound in the present invention.

(VI)

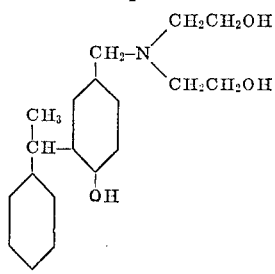

Additional examples of useful phenols are polynuclear phenols, polyphenyl, phenols, phenols linked by alkylene bridges (novolaks), fused phenols and the like such as diphenol, 4,4'-dihydroxy-diphenyl-dimethylmethane, 4,4'-dihydroxy - diphenyl - methyl-methane, 4,4'-dihydroxy-diphenylmethane, 1-naphthol, 2-naphthol, and the like having at least one reactive hydrogen therein.

Formula VII illustrates a Mannich Base compound obtained by bridging two phenols containing methylenic diethanolamine radicals by reaction with formaldehyde. This Mannich Base compound in which two phenolic nuclei or two phenolic moieties are linked by an alkylene bridge is particularly useful in the present invention. The Mannich Base compound shown in Formula VII contains two reactive hydrogen atoms which can be further substituted by the Mannich reaction if desired.

(VII)

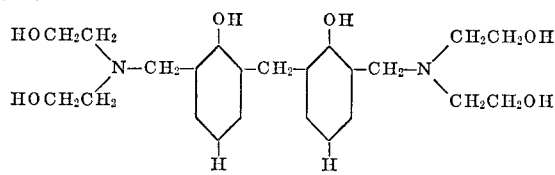

Phenols having two free phenolic hydroxyl groups and having at least one reactive hydrogen in the phenolic nucleus such as catechol, resorcinol, hydroquinone and the like can also be employed in the Mannich reaction to produce Mannich Base compounds useful in the present invention.

Thus, as shown by the aforedescribed examples of phenols which are useful herein, it is clear that wherever the term phenol is used, it is intended to encompass the phenols of the kind described above in addition to phenol itself and including phenols having one, two or more phenolic nuclei or moieties.

The above Mannich Base compounds can be prepared in the following manner by reaction of alkanolamine, aldehyde and phenol at about 5° C. to about 110° C. Usually from one to three moles of the desired alkanolamine and a solvent such as water or a monohydric alcohol are charged to a reactor equipped with agitator, reflux condenser and provision for external heating and cooling. The amine solution is cooled to about 5° C. to about 15° C. and a solution of from one to three moles of an aldehyde, said aldehyde being present in approximately equimolar amount with respect to the alkanolamine, in a solvent such as water or a monohydric alcohol is added to the cooled alkanolamine solution over a period of from one-half to two hours. The temperature is maintained below about 15° C. during this addition. A solution containing one mole of the desired phenol in a solvent such as water or a monohydric alcohol is then added to the reaction mixture over a period of from one-half to two hours while the temperature is maintained in the range of from about 15° C. to about 40° C. The resulting reaction mixture is then stirred for an additional fifteen minutes to two hours at a temperature of from about 15° C. to about 40° C., then heated to from about 60° C. to about 90° C. and held at this temperature for from one to four hours to complete reaction. The resulting product which is the Mannich Base compound is then heated under vacuum to remove water, monohydric alcohols and other volatile materials by distillation. Vacuum distillation is continued at about 90° C. to about 110° C. until the water content of the resulting Mannich Base compound is about 0.5% or less by weight.

Mannich Base compounds prepared by the foregoing procedure may contain available reactive hydrogen atoms in the phenolic moiety or phenolic moieties present in the Mannich Base compound. Such reactive hydrogen atoms will be in unsubstituted ortho and para positions in the phenolic moieties. It is to be understood that when said phenol in the Mannich Base compound contains a plurality of phenolic moieties, there will be a maximum of two available reactive hydrogens in the first phenolic moiety and only one in each of the remaining phenolic moieties. Formula VIII illustrates a Mannich Base compound in which the phenol has three phenolic moieties and four available hydrogens in the ortho and para positions.

(VIII)

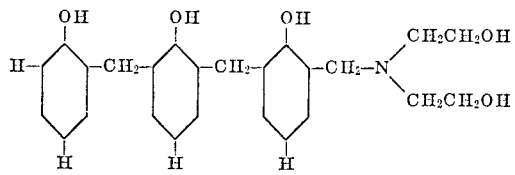

Likewise, Formula IX illustrates a Mannich Base compound in which the phenol has four phenolic moieties and five available reactive hydrogens in the ortho and para positions.

(IX)

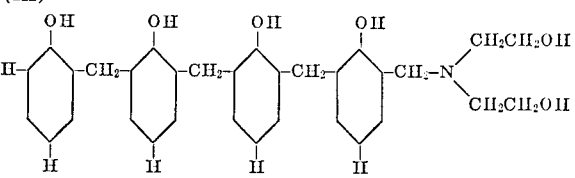

It is of course understood that replacement of available hydrogens with methylenic alkanolamine radicals in the phenolic moiety will reduce available unreacted hydrogen atoms for subsequent reaction. When desired, the above Mannich Base compound procedure may be employed to replace any available reactive hydrogen atoms in the Mannich Base compound with methylenic alkanolamine radicals. Likewise, such reactive hydrogen atoms can be reacted with bridging agents such as aldehydes, aldehyde compositions which liberate aldehydes and the like to produce dimers, trimers and higher polymers of the Mannich Base compounds.

The above described Mannich Base compounds can be prepared by procedures other than the Mannich reaction, e.g., chloromethylation and conversion of the resulting chloro derivatives to alkanolamines. Such procedures are equally useful in preparing Mannich Base compounds and can be employed to prepare isomers and homologues not readily obtainable by the Mannich reaction. For this reason, the present invention is not to be construed as limiting useful Mannich Base compounds to only those compounds obtained by the Mannich reaction. The term Mannich Base compound as used herein encompasses those compounds containing at least one phenolic hydroxyl group and at least one methylenic alkanolamine group attached to an aromatic nucleus present in the compound regardless of their preparation.

Hydroxyl containing nitrogen compounds useful in the present invention are prepared by condensing at least one mole of an alkylene oxide containing from two to 57 carbon atoms with each phenolic hydroxyl group present in the Mannich Base compound. Formula X illustrates an alkylene oxide adduct obtained when one mole of an alkylene oxide, $R_3O$ containing from two to 57 carbon atoms is condensed with a Mannich Base compound wherein $R_1$ and $R_2$ are alkylene groups containing from two to twelve carbon atoms and $R_1$ and $R_2$ can be alike or different.

(X)

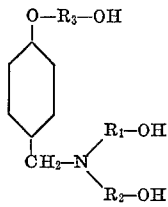

When the alkylene oxide adduct shown in Formula X is further condensed with an alkylene oxide, $R_4O$ containing from two to 57 carbon atoms, an adduct of the type shown in Formula XI is obtained:

(XI)

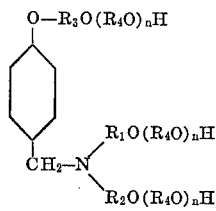

wherein $R_1$ and $R_2$ are alkylene groups containing from two to twelve carbon atoms and $R_1$ and $R_2$ can be alike or different; and the value of $n$ may vary from 0 to about 150 depending on the number of moles and the type of the alkylene oxide employed and may be a fractional quantity. For example, for $n$ to be greater than 1, $R_4O$ must be derived from ethylene oxide, propylene oxide, butylene oxide or styrene oxide. It is to be understood that Formulas X and XI are presented merely to illustrate two of the type of hydroxyl containing nitrogen compounds obtained by condensing one or more alkylene oxides with a Mannich base compound of the type shown in Formula II above and are not to be construed as limiting this invention. Similar compounds can be prepared by alkoxylation of the other Mannich Base compounds shown in the formulas above, that is, Formulas I and III–IX (inclusive) as well as mixtures of such compounds. It should be understood that when additional alkylene oxide, i.e., in excess of one mole per phenolic hydroxyl present in the phenolic nucleus, is introduced on to the Mannich Base compound, such alkylene oxide may distribute itself upon the Mannich Base compound in various ways. For example, instead of the alkylene oxide, $R_4O$ adding on the alkylene oxide, $R_3O$ and on to the hydroxyl groups of both of the alkanol groups of Formula XI, it can add on in other ways. For example, the alkylene oxide $R_4O$ can add entirely on to the alkylene oxide $R_3O$ or entirely upon one or both of the hydroxy groups of the alkanolamines. However, it is most likely that the alkylene oxide $R_4O$ adds uniformly on to all of the available hydroxy groups, i.e., those from the prior alkylene oxide addition and from the alkanolamines. It is well known that the alkylene oxides condense preferentially with the phenolic groups, then with the primary alkanol groups and then with any secondary alkanol groups present. Hence, in preparing the hydroxyl containing compounds, the phenolic hydroxyl will react with the alkylene oxides in all cases. The large variety of types of alkoxylated Mannich Base compounds which can be employed precludes presentation of a general formula to cover all various types of useful hydroxy containing nitrogen compounds. The condensations between the alkylene oxides and Mannich Base compounds are carried out at a temperature of from about 30° C. to about 200° C. and the Mannich Base is dehydrated prior to condensation so that it has a water content of less than 0.5% by weight. When desired, an alkoxylation catalyst such as an alkali metal hydroxide, a basic catalyst or other suitable alkoxylation catalyst may be used. Typical catalysts include sodium hydroxide, sodium methylate, potassium hydroxide, boron trifluoride etherate and the like. These catalyst are employed in concentrations from about 0.01% by weight to about 1.0% by weight based on the weight of Mannich Base compound. Such alkoxylation catalysts are well known in the art. Frequently, the amine groups present in the Mannich Base compound provide sufficient basicity to promote the condensation of the phenolic hydroxyl groups with the alkylene oxide and catalyst addition will not be necessary during the initial phase of the condensation. However, if the reaction is sluggish at any point during the condensation, the reaction rate can be promoted by the addition of from about 0.01% by weight to about 1.0% by weight of one of the above-mentioned catalysts. Since the phenolic hydroxyl groups are more reactive than the hydroxyl groups present in the alkanol groups, the phenolic hydroxyl groups condense with alkylene oxide first to form hydroxyalkyl phenoxy groups. The alkylene oxide then condenses with free hydroxyls in the hydroxy alkyl groups and the free hydroxyls present in the alkanol groups to form an alkylene oxide or polyoxyalkylene chain so that each chain is terminated at one end by a free hydroxy group. The resulting hydroxy containing nitrogen compounds contain at least two free and reactive terminal hydroxyl groups. Such hydroxyl containing nitrogen compounds are, in effect, aromatic polyols having diol, triol, tetrol, pentol or higher hydroxyl functionalities.

The alkoxylation procedures employed in preparing these hydroxyl containing compounds are well known. Such procedures have been used extensively commercially in the preparation of nonionic surfactants, polyethers for polyurethane resins and other alkylene oxide derivatives. Typical alkoxylation procedures are described in U.S. Pat. No. 2,213,477, Steindorff et al. (Sept. 3, 1940).

As examples of alkylene oxides which may be employed in alkoxylation of Mannich Base compounds, any alkylene oxide containing from two to 57 carbon atoms may be used. Such alkylene oxides include ethylene oxide, propylene oxide, butylene oxide, hexylene oxide, octylene oxide, decylene oxide, dodecylene oxide, styrene oxide, glycidol, their isomers, their mixtures and the like. Other alkylene oxides include dicyclopentadiene dioxide, limonene dioxide, 3,4-epoxy-6-methylcyclohexylmethyl-3,4-epoxy - 6-methylcyclohexane-carboxylate, the diepoxide of the diglycidyl derivative of 4,4'-dihydroxy - diphenyl - dimethyl methane, epoxidized soya bean oil, e.g., containing 7% by weight of oxide, monoglycidyl ethers of alcohols such as Epoxide 7, 8, 44 and 45 produced by Proctor & Gamble Co., Cincinnati, Ohio, and the like. Epoxide 7 is a monoglycidyl ether of a mixture of $C_8$ to $C_{10}$ alcohols containing a total of from about 11 to 13 carbon atoms and having an oxide content of about 7% by weight. Epoxide 8 is a monoglycidyl ether of a mixture of $C_{12}$ to $C_{14}$ alcohols, containing a total of from about 15 to 17 carbon atoms and having an oxide content of about 5.6. Epoxide 44 is a monoglycidyl ether of a mixture of $C_{14}$ alcohols, containing an average of 17 carbon atoms and having an oxide content of about 5.2% by weight. Epoxide 45 is a monoglycidyl ether of a mixture of $C_{16}$ to $C_{18}$ alcohols containing a total of from about 19 to 21 carbon atoms and having an oxide content of about 4.3% by weight. If desired, alkylene oxides such as ethylene oxide, propylene oxide, butylene oxide and styrene oxide may be condensed sequentially. That is, the hydroxyl groups are reacted with one alkylene oxide and the resulting condensates reacted or capped with a dissimilar alkylene oxide. Likewise, the hydroxyl groups can be reacted with a plurality of moles of one one alkylene oxide such as ethylene oxide, propylene oxide, butylene oxide and styrene oxide to form a polyoxyalkylene block and then with a plurality of moles of a second alkylene oxide such as ethylene oxide, propylene oxide, butylene oxide and styrene oxide to form a second polyoxyalkylene block so that each hydroxyl group is a chain which contains at least two dissimilar polyoxyalkylene blocks.

It is of course understood that the addition of alkylene oxides to the Mannich Base compound can be carried out either before or after the Mannich Base compound is reacted with the prepolymer. When carried out after reaction with the prepolymer, it is clear that there are fewer hydroxyl groups available for reaction.

PREPARATION OF PREPOLYMERS

Polyisocyanates are used in the form of isocyanate terminated urethane prepolymers which are prepared by reacting one or more polyisocyanates with a hydroxyl terminated compound having at least two terminal hydroxyl groups such as a polyol which is an alkylene polyol, a polyether which is a polyoxyalkylene polyol or a polyester. Such prepolymers are isocyanate terminated adducts of polyisocyanates and a hydroxyl terminated compound having at least two terminal hydroxyl groups such as a polyol, polyether or a polyester. The sole reactive groups in these isocyanate terminated prepolymers are reactive isocyanate groups. Such isocyanate terminated urethane prepolymers are well known in the art and are frequently used instead of polyisocyanates because the prepolymers are less toxic and have lower volatilities than polyisocyanates per se.

Isocyanate terminated urethane prepolymers are prepared under anhydrous conditions by mixing one or more of the hydroxy terminated compounds with an excess of an organic polyisocyanate and heating the resulting mixture to a temperature of from about 50° to about 100° C. to form a prepolymer whose sole reactive groups are reactive isocyanate groups. An alternate procedure is to react a polyisocyanate with a molar excess of a polyol, a polyether or a polyester having at least two terminal hydroxyl groups, then cap the resulting reaction product, that is, react it with additional organic polyisocyanate so that the sole reactive groups in the prepolymer are reactive isocyanate groups. By the term polyol or alkylene polyol is meant any hydroxyl containing alkylene compound which has diol, triol or higher hydroxyl functionality and has at least two terminal hydroxyl groups. By the term polyether or oxyalkylene polyol is meant any hydroxyl containing polyether compound having diol, triol or higher hydroxyl functionality and having at least two terminal hydroxyl groups. The polyesters, likewise, should have at least two terminal hydroxyl groups. By an excess polyisocyanate is meant at least 1.1 isocyanate groups for each terminal hydroxyl group. The preferred ratio of equivalents of isocyanate groups to hydroxyl groups in the prepolymer should be about 2:1. The quantity of reactive isocyanate in the prepolymer can also be expressed on a weight basis. Thus, for example, a prepolymer prepared from tolylene diisocyanate and a polyoxyethylene glycol having an average molecular weight of 300 has an isocyanate content of 14.3% by weight. It is clear that as the weight of the polyoxyethylene glycol increases, the weight percent of isocyanate in the prepolymer will decrease. Thus, a prepolymer from tolylene diisocyanate and a polyoxyethylene glycol having an average molecular weight of 3350 will have an isocyanate content of 2.3% by weight. When the prepolymer is the reaction product of a polyol, that is, an alkylene polyol such as trimethylol propane and a polyisocyanate such as tolylene diisocyanate, the prepolymer is customarily described as the reaction product of about one mole of trimethylol propane and about three moles of tolylene diisocyanate and the isocyanate content is not given. Examples of polyol prepolymers include the reaction product of tolylene diisocyanate with trimethylol propane at an NCO/OH ratio of 2:1 (Mondur CB) and the reaction product of tolylene diisocyanate with 1,2,6-hexanetriol at an NCO/OH ratio of 2:1. Such prepolymers are well known and have been used extensively. Likewise, when the prepolymer is the reaction product of a polyester and a polyisocyanate, it is described in terms of the polyester and polyisocyanate and the isocyanate content is not given. Such prepolymers are classified as polyether prepolymers, polyol prepolymers and polyester prepolymers and generally as isocyanate terminated urethane prepolymers or prepolymers because of their extensive use in the art.

Representative polyisocyanates, which can be employed in the production of prepolymers, include
tolylene-2,4-diisocyanate,
tolylene-2,6-diisocyanate,
tolylene diisocyanate (65% 2,4; 35% 2,6),
tolylene diisocyanate (80% 2,4; 20% 2,6),
1,6-hexamethylenediisocyanate (HDI),
1,4-tetramethylenediisocyanate,
hexamethylene diisocyanate,
1,10-decamethylenediisocyanate,
1,5-naphthalenediisocyanate (NDI),
cumene-2,4-diisocyanate,
4-methoxy-1,3-phenylenediisocyanate,
4-chloro-1,3-phenylene-diisocyanate,
4-bromo-1,3-phenylenediisocyanate,
4-ethoxy-1,3-phenylene-diisocyanate,
2,4′-diisocyanatodiphenylether,
diphenyl methane-4,4′-diisocyanate (MDI),
5,6-dimethyl-1,3-phenylenediisocyanate,
2,4-dimethyl-1,3-phenylene diisocyanate,
4-isopropyl-1,3-phenylene diisocyanate,
4,4′-diisocyanatodiphenylether,
benzidinediisocyanate,
o-nitrobenzidene diisocyanate,
4,6-dimethyl-1,3-phenylenediisocyanate,
9,10-anthracene-diisocyanate,
4,4′-diisocyanatodibenzyl,
3,3′-dimethyl-4,4′-diisocyanato-diphenylmethane,
2,6-dimethyl-4,4′-diisocyanatodiphenyl,
2,4-diisocyanato-stilbene,
4,4′-diphenyl diisocyanate (XDI),
3,3′-dimethyl-4,4′-diphenyl diisocyanate (TODI),
3,3′-dimethoxy-4,4′-diphenyl diisocyanate (DADI),
1,4-anthracenediisocyanate,
mesitylene diisocyanate,
durylene diisocyanate,
2,5-fluorenediisocyanate,
1,8-naphthalenediisocyanate,
2,6-diisocyanatobenzofuran,
2,4,6-toluenetriisocyanate,
tritolylmethane triisocyanate,
2,4,4′-triisocyanatophenyl ether
and the like. Another useful isocyanate (PAPI-1) has the general formula

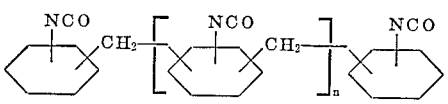

where $n$ has an average value of about 1. Mixtures of polyisocyanates may also be used.

Typical examples of isocyanate terminated urethane prepolymers include those formed by reaction of tolylene diisocyanates and polyethers (polyoxyalkylene polyols). Polyethers used in these prepolymers may have average molecular weights of about 136 to 5000 and preferably 600 to 4000 and include, for example, polyoxyethylene glycol having a molecular weight of 1540, polyoxypropylene glycol having a molecular weight of 1025, polyoxytetramethylene glycol, polyoxyhexamethylene glycol, polyoxyoctamethylene glycol, polyoxynonamethylene glycol, polyoxydecamethylene glycol, polyoxydodecamethylene glycol and mixtures thereof. Polyoxyalkylene glycols containing several different radicals in the molecular chain such as, for example, the compound

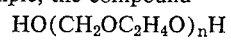

wherein $n$ is an integer greater than 4 can also be used. For example, polyacetals having hydroxyl groups and molecular weights of about 136 or more can be prepared when an aldehyde and an alcohol such as formaldehyde and ethylene glycol are reacted.

Other polyoxyalkylene polyols, which can be employed in the preparation of the polyether prepolymers, include those prepared by reaction of 1,2-alkylene oxides such as ethylene oxide, propylene oxide, butylene oxide, their mixtures and the like with polyhydroxy compounds such as glycerol, hydroxyl containing glycerides, trimethylolethane, trimethylolpropane, 1,2,6-hexanetriol, pentaerythritol, dipentaerythritol, tripentaerythritol, sorbitol, mannitol and the like, glucosides such as methyl, ethyl, propyl, butyl and 2-ethylhexyl arabinsoide, xyloside, fructoside, glucoside, rhammoside and sucrose. For example, an ethylene oxide adduct of glycerol having an average molecular weight of 2000 can be used. A propylene oxide adduct of trimethylolpropane terminated with ethylene oxide to obtain a product with primary hydroxyl groups having an average molecular weight of 4500 can also be employed. Likewise, an ethylene oxide adduct of pentaerythritol having an average molecular weight of 3000 can be used. A propylene oxide adduct of 1,2,6-hexanetriol having an average molecular weight of 1000 can be employed. Polyoxyalkylene polyols obtained by reacting alkylene oxides with mononuclear polyhydroxybenzenes such as resorcinol, pyrogallol, phloroglucinol, hydroquinone, 4,6-di-t-butylcatechol, catechol, orcinol, and other alkylated polyhydroxy benzenes are also useful. Likewise polyoxyalkylene polyols prepared by reacting alkylene oxides with fused ring systems such as 3-hydroxy-2-naphthol, 6,7-dihydroxy-1-naphthol, 2,5-dihydroxy-1-naphthol, 9,10-dihydroxyanthracene, 2,3-dihydroxyphenanthrene and the like can be used.

Other polyoxyalkylene polyols which can be employed include those obtained by reacting 1,2-alkylene oxides or mixtures thereof with polynuclear phenols such as the various di-, tri- and tetraphenol compounds in which phenols are attached by means of single bonds or by an aliphatic hydrocarbon radical.

Another particularly useful group of polyoxyalkylene polyols which can be employed are the alkylene oxide adducts of the novolaks. These products are believed to be mixtures of polynuclear compounds of the diphenylmethane type of structure such as 4,4'-dihydroxydiphenylmethane and 2,4'-dihydroxydiphenylmethane formed by the Baeyer reaction of phenol and formaldehyde. In a typical synthesis, novolaks are prepared by condensing one mole of a phenol, such as phenol, cresol or other alkylphenol with 0.8 mole of an aldehyde such as formaldehyde or furfuraldehyde under acidic conditions at temperatures of from 160° C. to 170° C. These polynuclear phenols frequently contain 4 to 8 units and may contain 12 or more units. They are non-curable thermoplastic resins.

Further included are the polyoxyalkylene polyols having nitrogen bridges prepared by reacting one or more of the alkylene oxides described above with ammonia or acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylene pentamine, and the like. A particularly suitable polyoxyalkylene polyol is the propylene oxide addition product of diethylenetriamine represented by the formula:

[HO(H₆C₃O)ₙ]₋₂N—CH₂—CH₂—N—CH₂—CH₂—N—[(OC₃H₆)ₙOH]₂
(OC₃H₆)ₙOH wherein $n$ represents an integer which provides an average molecular weight of 300 or more.

Other suitable polyoxyalkylene polyols include the 1,2-alkylene oxide derivatives of mononuclear primary amines such as o-, m-, and p-phenylenediamine; 2,4- and 2,6-diaminotoluene; 2,6-diamine-p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4-naphthylenediamine; 1,5-naphthylenediamine; 1,8-naphthylenediamine; benzidine; toluidine; 4,4'-methylenedianiline; 3,3'-dimethoxy-4,4'-biphenyldiamine; 3,3'-dichloro-4,4'-biphenylidiamine; 3,3'-dimethyl-4,4'-biphenyldiamine; 4,4'-ethylenedianiline; 4,4'-ethylidenedianiline; 1-fluorenamine; 2, 5-fluorenediamine, 2,7-fluorenediamine; 1,4-anthradiamine; 3,3'-biphenyldiamine; 3,4-biphenyldiamine; 9,10-diaminophenanthrene; 4,4'-diaminobenzene and the like.

Higher functional mono- and polynuclear polyamines can also be reacted with 1,2-alkylene oxides to provide useful polyoxyalkylene polyols. These amines include 2,4, 6-triaminotoluene, 2,3,5-triaminotoluene; 5,6-diaminoacenaphthalene, 4,4',4''-methylidynetrianiline, 3,5-diaminobenzoic acid, triaminodiphenyl ethers and sulfides such as 2,4,4'-triaminodiphenyl ether, 2,3',4-triamino-4'-methoxydiphenyl ether, the corresponding sulfides and the like; polyamines obtained by interaction of aromatic monoamines with formaldehyde or other aldehydes, for example:

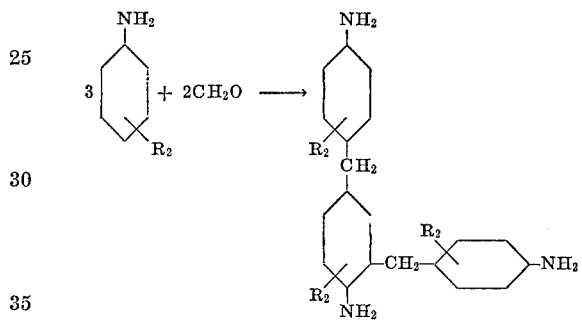

wherein R₂ is hydrogen or an alkyl group.

Polyoxyalkylene polyols having sulfur bridges include the condensation products of thioglycol with itself or with other polyhydric alcohols such as ethylene glycol, diethylene glycol, trimethylolpropane and the like. Such polyols can also be condensed with the abovementioned aromatic amines and phenols. Other suitable polycondensation products having sulfur and nitrogen bridges include those obtained by reaction of thioglycol with aromatic amines such as xylidene, toluidines or reaction products of these aromatic amines with alkylene oxides such as ethylene oxide, propylene oxide, butylene oxide, their mixtures and the like.

Polyols, that is, alkylene polyols which can be used to form prepolymers include hydroxyl terminated compounds having at least two terminal reactive hydroxyl groups such as ethylene glycol, trimethylolpropane, glycerol, butylene glycols, hexylene glycols, pentaerythritol, dipentaerythritol, tripentaerythritol, sorbitol, carbohydrates, sucrose, other sugars and the like, butanetriols, hexanetriols and the like.

Polyesters, which can be used instead of or in conjunction with alkylene polyols or polyethers (polyoxyalkylene polyols) in preparing isocyanate terminated urethane prepolymers, include, for example, those formed by reacting organic aliphatic, cycloaliphatic or aromatic di- or polycarboxylic acids, or their ester forming derivatives thereof such as anhydrides, acid halides and the like with polyols. These hydroxyl terminated polyesters must have at least two terminal hydroxyl groups. They can also be prepared by known transesterification methods. These polyesters have molecular weights on the order of those of the aforementioned polyoxyalkylene glycols, that is, about 178 to about 5000 and preferably about 600 to about 4000. Acids useful for preparing such polyesters include oxalic, maleic, azelaic, itaconic, citraconic, succinic, adipic, suberic, sebacic, o-phthalic, isophthalic, terephthalic, and hexahydroterephthalic acids, their anhydrides and the alkyl unsaturated and halogen substituted derivatives of these acids as well as their homologues. Other typical acids include hydroxy acids containing from 15 to 20 carbon atoms such as hydroxy palmitic acids, hydroxy stearic acids, ricinoleic acid and the like. Other dibasic acids include dimer acids such as the dimerized unsaturated acids chosen from the octadecadienoic acids preferably from the 9,12-octadecadienoic acid (linoleic acid) to form dilinoleic acids. The dilinoleic acids are prepared by the Diels-Alder reaction. Various fats and oils such as castor oil, soybean oil and the like can also be used. Tribasic acids such as propane tricarboxylic acid, higher alkane tricarboxylic acids, benzene tricarboxylic acids, other aromatic tricarboxylic acids, trimeric acids of $C_{18}$ acids, their anhydrides or the like can be used. Useful polyols for preparing the polyesters include low molecular weight polyols such as ethylene glycol, diethylene glycol, triethylene glycol, 1,4-butylene glycol, 1,6-hexanediol and their mixtures; glycerol, trimethylolpropane, 1,2,6-hexanetriol, pentaerythritol, dipentaeryhtritol, tripentaerythritol, sorbitol, sucrose and the like as well as reaction products of the abovementioned polyols with alkylene oxides such as ethylene oxide, propylene oxide, butylene oxide, their mixtures and the like.

Such polyesters must contain at least two terminal hydroxyl groups. Useful polyesters can be prepared by esterification of from about 2 moles to about 1.02 moles of an alkylene glycol such as ethylene glycol with one mole of a dicarboxylic acid such as oxalic acid. Polyesters having molecular weights of from about 178 to about 5000 are useful in the present invention. When polyols having more than two hydroxyl groups or polycarboxylic acids having more than two carboxylic acid groups are employed, the resulting polyesters will contain more than two terminal hydroxyl groups.

It is to be understood that the polyol, polyether and polyester prepolymers described above must be terminated with unreacted, i.e., free, or reactive isocyanate groups for subsequent reaction with the hydroxyl containing nitrogen compound and that such terminal reactive isocyanate groups are the only reactive groups present in the prepolymer molecule.

PREPARATION OF TREATING AGENTS AND THEIR USE

The hydroxyl containing nitrogen compounds and the isocyanate terminated urethane prepolymers described above are interreacted to obtain new and novel urethane compositions of matter which are useful as treating agents in the present invention. The hydroxyl containing nitrogen compounds and prepolymers are interreacted in such proportions that all of the reactive, i.e., unreacted or free isocyanate groups are reacted. If desired, the hydroxy containing nitrogen compound may be substituted in part by an alcohol such as ethanol, isopropanol or the like.

When the treating agents are used in the form of solutions or dispersions, particularly in aqueous systems, for the treatment of textiles, plastics, leather and the like, gelling of the final reaction product of the hydroxyl containing nitrogen compound and the prepolymer should be avoided so that treating agents having useful viscosities, solubility characteristics and dispersibility characteristics are obtained. Gelation of the final product can be controlled by selection of the ratio in which the hydroxyl terminated groups in the hydroxyl containing nitrogen compounds as well as from any alcohols present are reacted with the reactive isocyanate groups in the prepolymer. Generally, to avoid gelation, the ratio of the hydroxyl terminated groups to isocyanate groups should be not less than 2:1. Of course, an excess of hydroxyl terminated groups can be present, however, this is not essential in the present invention. For example, in the case of a difunctional prepolymer, that is, a prepolymer containing two reactive isocyanate groups available for reaction with the hydroxyl terminated groups present in the hydroxyl containing nitrogen compound, a hydroxyl containing nitrogen compound having three hydroxyl terminated groups such as those shown in Formulas X and XI above is reacted with the prepolymer in a ratio of not less than six hydroxyl terminated alkanol groups per two reactive isocyanate groups, that is, not less than two moles of the hydroxyl containing nitrogen compound is reacted with one mole of the difunctional prepolymer. Likewise not less than three moles of the hydroxyl containing nitrogen compound such as those shown in Formulas X and XI above is interreacted with one mole of a trifunctional prepolymer, that is, a prepolymer containing three reactive isocyanate groups to avoid gelation. Additionally, to avoid gelation, at least four moles of the hydroxyl containing nitrogen compound such as those shown in Formulas X and XI above should be interreacted with one mole of a tetrafunctional prepolymer, that is, a prepolymer containing four reactive isocyanate groups.

Where the hydroxyl containing nitrogen compound contains five hydroxyl terminated groups, at least one mole of said hydroxyl containing nitrogen compound is reacted with a difunctional prepolymer, that is, a prepolymer containing two reactive isocyanate groups. When the hydroxyl containing nitrogen compound contains seven hydroxyl terminated groups, at least one mole of the hydroxyl containing nitrogen compound is interreacted with one mole of a trifunctional prepolymer, that is, a prepolymer containing three reactive isocyanate groups.

In cases where the hydroxyl containing nitrogen compound has only two hydroxyl terminated groups in the molecule as in the case of a hydroxyl containing nitrogen compound derived from a monoalkanolamine such as monoethanolamine or N-methyl monoethanolamine, gelation is usually avoided by interreaction of as little as one mole of the hydroxyl containing nitrogen compound with each reactive isocyanate group in the prepolymer. For example, two moles of the hydroxyl containing nitrogen compound, each mole of which contains two hydroxyl terminated groups can be interreacted with one mole of a difunctional prepolymer containing two reactive isocyanate groups. Likewise, three moles of the same hydroxyl containing nitrogen compound can be interreacted with one mole of a trifunctional prepolymer and four moles of the same hydroxyl containing nitrogen compound can be interreacted with one mole of a tetrafunctional prepolymer. It is to be understood that mixtures of hydroxyl containing nitrogen compounds having varying numbers of hydroxyl terminated groups can be reacted with mixtures of isocyanate prepolymers having varying numbers of reactive isocyanate groups. However, for those applications where it is desirable to avoid gelation, the abovementioned limitations should be observed. The final product is a treating agent which is a polyurethane polymer which contains terminal hydroxy groups and does not contain reactive isocyanate groups, that is, unreacted or active or free isocyanate groups.

Treating agents can be prepared by interreaction of hydroxyl containing nitrogen compounds and isocyanate terminated urethane prepolymers for about thirty minutes to about six hours at temperatures of from about 25° to about 160° C. Such reactions are carried out under anhydrous conditions. Hydroxyl containing nitrogen compounds can be interreacted with prepolymers by the following procedure. The required amount of isocyanate terminated urethane prepolymer is charged into a reactor equipped with agitator and heated with agitation to a temperature of from about 40° to about 80° C. The required amount of hydroxyl containing compound is heated in a second reactor to a temperature of from about 40° to about 80° C. The heated prepolymer is then slowly added over a period of time from about fifteen minutes to about two hours to the heated hydroxyl containing nitrogen compound in the second reactor while the reaction temperature is maintained at from about 40° to about 80° C. After addition of the prepolymer is complete, the reaction mixture is heated to a temperature of from about 80° to about 160° C. and maintained within this temperature range for about thirty minutes to about four hours to complete reaction. The resulting product, which is a treating agent, is cooled to room temperature. Optionally, the hydroxyl containing nitrogen compound and prepolymer can be mixed at about 25° C. and interreacted at temperatures up to about 160° C. to complete reaction. When desired, an anhydrous inert solvent may be employed.

The treating agent may be used directly or may be used to prepare treating agent formulations. The agent may be reacted with acids to form salts that are soluble or dispersible in water and/or other solvents. Inorganic acids such as hydrochloric acid, sulfuric acid, phosphoric acid, nitric acid and the like may be used to prepare salts of the treating agents. Likewise, organic acids such as formic acid, acetic acid, propionic acid, butyric acid, isobutyric acid, succinic acid, maleic acid and the like may be used in the preparation of salts of the treating agent. Such salts are prepared by reacting the acid and treating agent at a temperature of from about 25° C. to about 150° C. provided such conditions do not result in decomposition of the reactants or salts. Generally, one mole of the acid is reacted with at least one nitrogen atom present in the treating agent. When desired, all of the nitrogen atoms can be reacted. The salts can be formed in anhydrous or aqueous systems and solvents can be employed. Organic acids which form treating agent salts that disassociate on heating are particularly useful in the preparation of treating agent formulations. When desired, formulations of treating agents or their salts can be prepared with surfactants, alcohols, chlorinated solvents and the like. Such formulations are useful in specific applications such as padding, brushing, dipping, spraying, coating and the like.

Surfactants such as nonionic surfactants and cationic surfactants can be used in such formulations. Such surfactants include nonionic surfactants obtained from the reaction of alkylene oxides such as ethylene oxide, propylene oxide, butylene oxide, their mixtures and the like with alkylphenols, fatty acids, alcohols and the like and cationic surfactants such as those obtained from the reaction of alkylene oxides with nitrogen containing hydrophobic compounds and those obtained by quaternization of nitrogen containing compounds. Useful surfactants include the Pluronics which are block copolymers consisting of polypropylene oxide and polyethylene oxide blocks and having molecular weights of from about 600 to about 100,000. The Pluronics are polyalkylene glycol ethers. The Tergitol surfactants which are polyalkylene glycol ethers, produced by Union Carbide Corporation having molecular weights ranging from about 1000 to about 50,000 can also be used. Spans and Tweens such as sorbitan monoleate, sorbitan monolaurate, sorbitan monopalmitate, sorbitan monostearate, sorbitan tristearate, sorbitan trioleate, polyoxyethylene sorbitan monostearate, polyoxyethylene sorbitan monopalmitate, polyoxyethylene sorbitan monostearate and the like can also be used. Specific products include Span 20, Span 40, Span 60, Span 85, Tween 40, Tween 60 and Tween 80. Mixtures of the above surfactants can be used.

Solvents which can be employed in treating agent compositions include water, hydrophilic alcohols such as methanol, ethanol, 2-methoxyethanol, isopropanol and the like, hydrophobic alcohols, such as octyl alcohol, decyl alcohol and the like, chlorinated solvents such as chlorinated ethylenes, chlorinated benzenes and the like and hydrocarbon solvents such as petroleum ether, mineral spirits, benzene, toluene, xylenes, their mixtures and the like.

When the treating agents are formulated with solvents, from about 0% by weight to about 99% by weight of solvents based on the weight of the treating agent can be used. When the treating agents are formulated with surfactants from about 0% by weight to about 20% by weight of surfactants based on the weight of treating agent can be used.

Another embodiment of this invention includes quaternary compounds and their use as treating agents. These quaternaries are of two types, i.e., those prepared by reacting either (1) the hydroxyl containing nitrogen compound or (2) the reaction products of these nitrogen compounds and prepolymers with quaternizing reagents such as methyl chloride, methyl bromide, methyl iodide, ethyl chloride, benzyl chloride, dimethyl sulfate and the like. Generally one mole of the quaternizing agent is reacted with at least one nitrogen atom present in the hydroxyl containing nitrogen compound or its reaction product with a prepolymer. When desired, all of nitrogen atoms present in the hydroxyl containing nitrogen compound or its reaction product with the prepolymer can be reacted with the quaternizing agent. The reaction is carried out under substantially anhydrous conditions at a temperature of from about 25° C. to about 100° C. for a period of from about one hour to about ten hours, but temperatures up to about 150° C. can be employed provided the reactants and products are heat stable and do not decompose. The reaction should be carried out under pressure when temperatures above 100° C. are used or volatile quaternizing reagents are employed. When desired, an inert solvent can be used, that is, a solvent which does not react with the quaternizing agent. Such quaternary compounds may be used directly as treating agents or can be formulated. The surfactants and solvents described above may be used in the formulation of treating agent containing quaternary compounds derived from the hydroxyl containing compounds and their reaction products with the prepolymers disclosed in the present invention.

Preparation of the hydroxyl containing nitrogen compounds, isocyanate terminated urethane prepolymers, reaction products of these compounds with such prepolymers, quaternaries of the hydroxyl containing nitrogen compounds and their reaction products with such prepolymers are generally carried out at atmospheric pressure. The prepolymer preparations are carried out under a nitrogen blanket to provide anhydrous conditions during reaction. When desired, any other inert anhydrous gas may be employed as a gas blanket to provide anhydrous conditions. Optionally, a nitrogen blanket can be used in the reaction between the prepolymer and hydroxyl containing nitrogen compound. Likewise, the alkoxylation of Mannich Base compounds is carried out under substantially anhydrous conditions. Reaction of the resulting hydroxyl containing nitrogen compound and prepolymer to obtain the treatment agent is also carried out under substantially anhydrous conditions.

The treating agents disclosed in this invention are useful in the treatment of fibrous materials such as textiles, plastics, leather, paper and the like. Such agents include the hydroxyl containing nitrogen compounds, their acid addition salts, their quaternaries, reaction products of the hydroxyl containing nitrogen compounds and isocyanate terminated urethane prepolymers, their acid addition salts and their quaternaries.

These agents may beu sed to treat textile materials such as fibers, fabrics and the like. Such textile materials include those derived from natural, man-made and synthetic fibers such as cotton, wool, silk, jute, hemp, fur, flax, kapok, rayon, cellulose acetate, cellulose triacetate, polyamides such as nylon, polyesters such as polyethylene terephthalate (Dacron), acrylics such as polyacrylonitrile, vinyl resins such as copolymers of polyvinyl chloride and polyvinyl acetate, copolymers of vinylidene chloride and vinyl chloride, copolymers of acrylonitrile and vinyl chloride and the like, polystyrene, polyethylene, polypropylene, polyurethane, glass, ceramic, asbestos, protein fibers such as vicara and peanut protein blends of these and the like. The agents can be applied to the textile material by any of the procedures and equipment usually employed in coating or treating fibrous materials, including spraying, padding, dipping, brushing, knife and doctor blades, air blades, roller coatings, curtain coatings, gravure coatings and the like. The agents can be applied in concentrated forms or in dilute forms such as solutions, emulsions and the like depending on the type of application. When the agents are applied in dilute form, the treated material is dried at room temperature or at elevated temperatures up to about 150° C. The quantity of treating agent used may vary from about 0.01% by weight to about 3.0% by weight based on the weight of the dry fiber. Generally from about 0.1% by weight to about 1.0% by weight based on the weight of dry fiber is used. When desired, other additives such as stabilizers, antioxidants, thickeners, softeners, lubricants and the like can be formulated with the treating agents provided such additives are compatible with the treating agents which are cationic materials, that is, such additives do not interreact with agents to form gels, precipitates or the like. The treating agents are particularly useful in the treatment of textile materials to improve their antistatic properties and the like. Further, the agents are useful in improving other fiber properties such as lubricity, handle, drape, softness, dyeability, fullness, abrasion resistance, finish, other desirable textile properties and the like.

These treating agents are also useful as treating agents in the production of leather from animal skins such as cowhides, calfskins, goatskins, horsehides, reptile skins, other animal skins and the like. As examples of skins, which may be treated with these agents, there may be mentioned skins of freshly killed animals, limed skins, pickled skins, tanned skins, partly tanned skins, partly dechromed skins, dechromed skins and the like. The agents can be employed as treating agents for leather, pretanning agents, tanning agents, retanning agents and impregnating agents. They are particularly useful in the retanning of chrome stock leather. They produce retanned leathers having good break, excellent temper and tight grain. In retanning leather skins, which have been chrome tanned, split and shaved are used. Sides of leather vary in fiber density. There are looser areas in the leather, particularly in flank sections, where the fibers are long and less dense. The leather sides are retanned to upgrade the leather and to improve its quality and uniformity, that is, to fill and firm up looser areas.

The treating agents can be used in both two-step and one-step retanning processes. In a conventional two-step retanning process sufficient treating agent is applied in the form of a solution so that from about 0.1% to about 15% by weight of the treating agent based on the weights of leather is absorbed in the pores of the leather. Usually chrome tanned stock containing 50% by weight of water based on its wrung, split shaved weight is employed. The leather is then treated with a solution containing an anionic tanning agent so that from about 0.1% by weight to about 15% by weight of the anionic tanning agent based on the weight of the leather is absorbed in the pores of the leather. The anionic tanning agent will then interreact in the pores with the cationic treating agent in situ in the leather to fill the pores. In a conventional one-step retanning process, leather is treated with the reaction product of a treating agent and an anionic tanning agent so that from about 0.1% by weight to about 30% by weight of the reaction product of the treating agent and anionic tanning agent based on the weight of leather is absorbed and fills the pores of the leather. The treating agents disclosed in this invention produce excellent results in both types of retanning processes.

As examples of anionic agents which may be used in both the two-step and the one-step processes for retanning, there may be mentioned naphthalene sulfonic acid and formaldehyde condensation products, sulfonated formaldehyde phenol condensation products, condensation products of sulfonated phenol and formaldehyde, sulfonated products of dihydroxyphenol sulfone, sulfonated products of dihydroxydiphenyl propane, preferably in the form of omega sulfonate forms, sulfonated dihydroxydiphenyl methane, phenolic derivatives possessing a urea-formaldehyde condensation bridge or any resin intermediate as a bridge formation, lignin sulfonates, vegetable tannins such as wattle extract solubilized by sodium bisulfite, quebracho extract solubilized by sodium bisulfite, synthetic tannins known as extract tannins and having at least one sulfo radical and the like.

Such anionic agents include exchange tannins and auxiliary tanning agents in general. These tannins include those having sulfo groups and anionic complexes or phenol, cresol, xylenol, naphthol, catechol, resorcinol, naphthalene, anthtracene and benzidine with a methylene, sulfone, propane or sulfonimid bridge. Illustrative examples of these compounds are: disulfo dinaphthol methane, disulfo dinaphthyl methane, monosulfo dihydroxy diphenyl methane, a complex reaction product formed by reacting monosulfo dihydroxy diphenyl methane with formaldehyde to give the formula:

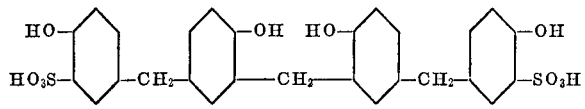

Omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl propane, disulfo dihydroxy diphenyl sulfone, and complex compounds containing a benzidine radical with a sulfonimide-bridge as illustrated by the following compound can also be used:

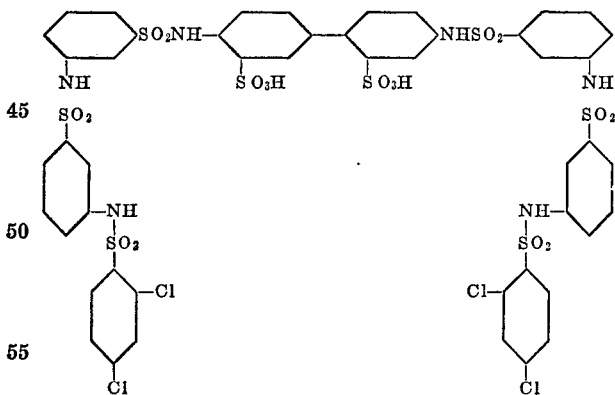

The treating agents disclosed in this invention are also useful in leather impregnation. Compositions containing from about 0.1 to about 30% by weight of treating agent based on the weight of leather can be prepared by diluting the treating agent with alcohol or alcohol-water mixtures. These compositions are used to impregnate and condition leather which has been previously fat-liquored. Excellent penetration of the leather with these compositions is obtained and no evidence of tackiness is noted after the impregnated leather has been dried. These compositions can be applied as spray coatings, curtain coatings, by drum applications and the like. Chrome tanned leather as well as vegetable tanned leather can be impregnated with these compositions.

Normally retanning operations are carried out at temperatures from about 40° F. to about 125° F. for periods of time ranging from about thirty minutes to about eight hours. Leather impregnation operations are usually carried out at about 40° F. to about 100° F. Drying operations are carried out by conventional methods.

For a fuller understanding of the nature and objects of this invention, reference may be made to the following examples which are given merely to illustrate the invention and are not to be construed in a limiting sense. All weights, proportions and percentages are by weight unless otherwise indicated. Likewise, all references to temperature are ° C. unless otherwise indicated.

EXAMPLE I (A) Preparation of a Mannich Base compound 315 g. (3 moles) of diethanolamine and 60 g. of methanol were charged into a glass flask equipped with agitator, reflux condenser and provisions for external heating. The charge was cooled to about 10° C. and 244.5 g. (3 moles) of aqueous formaldehyde (37% by weight active) was added at about 10° C. to about 15° C. slowly with agitation over sixty minutes. After addition was complete, a mixture of 282 g. (3 moles) of phenol and 25 g. of methanol was added at about 18° C. to about 22° C. over fifteen minutes with vigorous agitation. The resulting reaction mixture was agitated at about 18° C. to about 22° C. for one hour, heated to about 65° C. and agitated at about 65° C. for two hours to complete reaction.

The resulting reaction product which was the desired Mannich Base compound was then vacuum distilled to remove water, methanol and other volatile materials. Vacuum distillation was continued with heating until a pot temperature of 100° C. was reached. The reaction product was then held under vacuum at 100° C. for fifteen minutes and then cooled to 30° C. Analysis showed the water content of the Mannich Base compound was 0.5% by weight and the compound contained three hydroxyl groups, that is, one phenolic hydroxyl and two alkanol hydroxyl groups.

(B) Preparation of a hydroxyl containing nitrogen compound

A total of 211 g. (1 mole) of the Mannich Base compound obtained in part (A) above was charged into a glass flask equipped with agitator, reflux condenser and provisions for maintaining a nitrogen blanket over the compound and for external heating and cooling. The Mannich Base compound was heated to 95° C. with agitation under a nitrogen blanket. Propylene oxide was then introduced under the nitrogen blanket and condensed with the Mannich Base compound at a temperature of about 95° C. to about 110° C. to form the hydroxyl containing nitrogen compound which was a propoxylated adduct of the Mannich Base compound. Propylene oxide addition was continued under the above described conditions until a total of 116 g. (2 moles) of propylene oxide had reacted with the Mannich Base compound, that is, a total of two moles of propylene oxide was condensed with one mole of the Mannich Base compound. The resulting adduct of propylene oxide and Mannich Base compound was an aromatic polyol containing three terminal hydroxyl groups which consisted of two alkanol groups attached to a nitrogen atom and a hydroxyalkyl phenoxy group wherein the three hydroxyl groups had been partially reacted with propylene oxide, PrO, that is, 3 OH/1 PrO.

(C) Preparation of an isocyanate terminated urethane prepolymer (for use in subsequent examples)

1540 g. (1 mole) of a polyethylene glycol having an average molecular weight of 1540 was charged into a glass flask equipped with agitator, external heating and cooling facilities as well as provision for maintaining a nitrogen blanket over the reactants to provide anhydrous conditions during reaction. The polyethylene glycol was a solid and was heated to a temperature slightly above its melting point to liquefy the glycol.

348 g. (2 moles) of tolylene diisocyanate was added with agitation to the melted glycol over fifteen minutes. The reaction mixture was then heated with agitation to 70° C. and agitated at about 70° C. to about 75° C. for forty-five minutes to obtain an isocyanate terminated urethane prepolymer which had a reactive isocyanate content of 4.36% by weight.

EXAMPLE II (A) Preparation of a Mannich Base compound 2967 g. (28.2 moles) of diethanolamine and 1250 g. of water were introduced into a reaction vessel equipped with agitator and were agitated with cooling. When the temperature of the diethanolamine mixture reached about 8° C. to about 10° C., a mixture of 2303 g. (28.6 moles) of aqueous formaldehyde (37% by weight active) and 1250 g. of water at about 10° C. were introduced over a period of one and one-half hours with good agitation. The temperature was maintained at about 10° C. during this addition. A mixture of 1328 g. (14.1 moles) of phenol and 117 g. of water was then introduced at about 10° C. over twenty minutes with agitation. The resulting reaction mixture was then agitated for an additional hour at about 10° C. 785 g. of methanol was then added to the reaction mixture and the resulting mixture was heated to about 60° C. to about 65° C. and stirred at about 65° C. for two hours. Water, methanol and other volatile materials present in the reaction mixture were then removed by vacuum distillation. The reaction mixture was slowly heated under vacuum to about 100° C. to about 110° C. The reaction mixture was then held for fifteen minutes at about 110° C. under full vacuum and then cooled to room temperature. The reaction product remaining in the flask was a Mannich Base compound having a water content of about 0.2% by weight and containing five terminal hydroxyl groups, that is, one phenolic hydroxyl group and four alkanol hydroxyl groups.

(B) Preparation of a hydroxyl containing nitrogen compound 328 g. (1 mole) of the Mannich Base compound obtained in part (A) above was introduced into a glass flask equipped with agitator, reflux condenser and provisions for maintaining a nitrogen blanket over the compound and for external heating and cooling. The Mannich Base compound was heated with agitation to about 95° C. under a nitrogen blanket and condensed with the Mannich Base compound at a temperature of about 95° C. to about 110° C. An additional 87 g. (1.5 mole) of propylene oxide was then introduced to the reaction mixture and reacted at about 105° C. to about 110° C. The resulting product was a hydroxyl containing nitrogen compound which was the adduct of one mole of the Mannich Base compound and 2.5 moles of propylene oxide and contained five terminal hydroxyl groups, that is, four terminal alkanol hydroxyl groups and one hydroxyalkyl phenoxy group wherein the five hydroxyl groups had been reacted with 1.5 moles of propylene oxide, PrO, that is, 5 OH/1.5 PrO.

EXAMPLE III (A) Preparation of a Mannich Base compound

A mixture of 945 g. (9 moles) of diethanolamine and 390 g. of distilled water was charged into a glass flask equipped with agitator, reflux condenser and provisions for external heating and cooling. The charge was cooled to about 10° C. and 733.5 g. (9.05 moles) of aqueous formaldehyde solution (37% by weight active) and 398 g. of water was added slowly at about 10° C. to about 15° C. with agitation over a period of one hour. The formaldehyde and water solution was adjusted to a pH of 8.0 with sodium hydroxide solution prior to its addition to the diethanolamine solution. After reaction was complete, a mixture of 423 g. (4.5 moles) of phenol and 37.5 g. of water was added at about 10° C. to about 14° C. over fifteen minutes with vigorous agitation. The resulting reaction mixture was then agitated at about 10° C. to about 14° C. for one hour. 250 g. of methanol was then added and the reaction mixture was agitated and gradually heated to about 65° C. The reaction mixture was then heated at about 65° C. for two hours to complete reaction. The resulting reaction product which was the desired Mannich Base compound was then vacuum distilled to remove water, methanol and other volatile materials. Vacuum distillation with heating was continued until a pot temperature of about 100° C. was reached. The Mannich Base compound was then held under full vacuum at about 100° C. for fifteen minutes and cooled to about 30° C. Analysis showed that the water content of the Mannich Base compound was 0.71% by weight. The Mannich Base compound contained five terminal hydroxyl groups, that is, one phenolic hydroxyl group and four alkanoyl hydroxyl groups.

(B) Preparation of a hydroxyl containing compound

A total of 328 g. (1 mole) of the Mannich Base compound obtained in part (A) above was charged into a glass flask equipped with agitator, reflux condenser and provisions for maintaining a nitrogen blanket over the reactants and for external heating and cooling. The Mannich Base compound was heated to about 95° C. with agitation and under a nitrogen blanket. Propylene oxide was then introduced under the nitrogen blanket and condensed with the Mannich Base compound at about 95° C. to about 110° C. until a total of five moles of propylene oxide had been condensed with one mole of the Mannich Base compound. The adduct contained five terminal hydroxyl groups, that is, four terminal hydroxyl groups and one hydroxyalkyl group wherein the five hydroxyl groups had been reacted with 4 moles of propylene oxide, PrO, that is, 5OH/4PrO.

EXAMPLE IV (A) Preparation of a Mannich Base compound

A mixture of 420 g. (4 moles) of diethanolamine and 180 g. of distilled water was charged into a glass flask equipped with agitator, reflux condenser and provisions for external heating and cooling. The diethanolamine mixture was cooled to about 10° C. A solution containing 326 g. (4.02 moles) of aqueous formaldehyde (37% by weight) and 180 g. of distilled water which had been neutralized to a pH of 8.1 with 30° Bé. sodium hydroxide solution was prepared. The formaldehyde solution was slowly added with agitation at a temperature of about 10° C. to about 15° C. over a period of one hour. After addition of the formaldehyde solution was complete, 880 g. (4 moles) of nonylphenol was added at about 10° C. to about 16° C. over a period of about fifteen minutes with vigorous agitation. The resulting reaction mixture was then agitated for one hour at about 10° C. to about 16° C. 933.3 g. of methanol was then added to the reaction mixture and the reaction mixture was heated to about 65° C. and agitated at about 65° C. for two hours to complete reaction. The resulting product which was the Mannich Base compound was then vacuum distilled to remove water, methanol and other volatile materials. Vacuum distillation was continued with heating until a pot temperature of about 100° C. was reached. The Mannich Base compound was then held under full vacuum at about 100° C. for fifteen minutes and then cooled to about 30° C. to obtain a compound containing 0.5% by weight water. The Mannich Base compound contained three hydroxyl groups, that is, one phenolic hydroxyl group and two alkanol hydroxyl groups.

(B) Preparation of a hydroxyl containing nitrogen compound

A total of 337 g. (1 mole) of the Mannich Base compound obtained in part (A) above was charged into a glass flask equipped with agitator, reflux condenser and provisions for maintaining a nitrogen blanket over the reactants and for external heating and cooling. The Mannich Base compound was then heated with agitation to about 95° C. under a nitrogen blanket. Propylene oxide was then introduced under the nitrogen blanket and condensed with the Mannich Base compound at about 95° C. to about 110° C. to form the desired hydroxyl containing compound which was a propoxylene oxide adduct of the Mannich Base compound. Propylene oxide addition was continued until a total of 116 g. (2 moles) of propylene oxide had condensed and reacted with one mole of the Mannich Base compound. The hydroxyl containing nitrogen compound was the condensate of two moles of propylene oxide with one mole of the Mannich Base compound and contained three hydroxyl groups, that is, one hydroxyalkyl phenoxy group and two alkanol hydroxyl groups which had been partially reacted with one mole of propylene oxide, PrO, that is, 3OH/1PrO.

(C) Preparation of a treating agent

To 453 g. (1 mole) of the hydroxyl containing nitrogen compound obtained in part (B) above was introduced 126 g. (1 mole) of dimethyl sulfate over a period of two hours while the reaction temperature was maintained at about 45° to about 55° C. After dimethyl sulfate addition was complete, the reaction mixture was agitated for three hours at about 50° C. to complete the reaction. The reaction product was a quaternary ammonium salt which was useful as a treating agent. 579 g. of distilled water was added to the reaction product with agitation and stirred for one hour at about 50° C. to obtain a 50% by weight solution of the quaternary treating agent.

EXAMPLE V

This example is directed to a determination of the antistatic properties of treating agents on synthetic yarns. A polyethylene terephthalate yarn having a denier of 220 and containing 50 filaments in the denier was treated with a treating agent which was an aqueous solution of the quaternary ammonium salt obtained in part (C) of Example IV above. The treating agent was applied in the form of an aqueous solution containing 0.53% by weight of the 100% active quaternary ammonium salt. The application was a single end application using the Butterworth Padding Machine with a 20 lb. roll pressure at room temperature. The yarn was dried at 150° F. for forty-five minutes and coned. The wet pickup was predetermined to be 38% by weight of the solution and the treated yarn had a solids pickup of 0.1% by weight after drying based on the weight of the dry fiber.

The treated and untreated yarns were tested for antistatic properties after conditioning the yarns for twenty-four hours at 72° F. and 50% relative humidity. A potential of 180 volts was applied to each yarn by connecting the yarn to the positive and negative terminals of a battery. The connection was made by connecting the yarn with the positive and negative electrodes which were positioned 35 millimeters apart and were connected to the terminals of the battery. After the voltage was applied, the contact was broken and the charged yarn was connected to a voltmeter which indicated the voltage of the yarn. The time in seconds required for the voltage on the yarn to drop from 160 volts to 80 volts was measured and recorded as half-life seconds. If the treating agent on the yarn has good electrostatic properties, the voltage or charge on the yarn leaked off quickly after the contact was broken. The untreated yarn gave values of over 200,000 half-life seconds. The treated yarn, which contained 0.1% of the treating agent based on the weight of the dry yarn, gave values of 8 half-life seconds. These tests showed that treatment of synthetic yarns with the quaternary treating agents of this invention resulted in marked improvement in their antistatic properties, that is, the capacity of the yarns to retain electrostatic charges was greatly decreased.

EXAMPLE VI

(A) Preparation of a treating agent 240.8 g. (0.128 mole) of the urethane prepolymer obtained in part (C) above of Example I was charged into a glass flask and heated to its melting point. After the prepolymer was completely melted, 82 g. (0.252 mole) of the hydroxyl containing nitrogen compound obtained in part (B) of Example I was mixed with the molten prepolymer and heated to a temperature of about 90° C. to about 95° C. The resulting mixture was reacted for ninety minutes at about 90° C. to about 95° C. to obtain a treating agent which was designated as Treating Agent D. 322.8 g. of the treating agent obtained above was diluted with 307.8 g. of water and 15 g. of glacial acetic acid to obtain a 50% active solution of Treating Agent D.

(B) Preparation of a treating agent 240.8 g. (0.128 mole) of the isocyanate terminated urethane prepolymer obtained in part (C) of Example I above was charged into a glass flask and heated to its melting point. After the prepolymer was completely melted, 82 g. (0.252 mole) of the hydroxyl containing nitrogen compound obtained in part (B) of Example I above was mixed with the molten prepolymer and heated to a temperature of about 90° C. to about 95° C. The resulting reaction mixture was reacted at about 90° C. to about 95° C. for ninety minutes to obtain a treating agent which was designated as Treating Agent E. A solution of Treating Agent E was prepared by mixing 322.8 g. of a 40% by weight solution of the disodium salt of disulfo dinaphthyl methane, 322.8 g. of Treating Agent E and 322.8 g. of water. The resulting solution of Treating Agent E was 33.33% by weight active, that is, it contained this percentage of Treating Agent E.

EXAMPLE VII

Use of a treating agent in leather retanning 100 lbs. of shaved chrome stock leather based on the chrome tanned split shaved weight was put in a drum and wet back for thirty minutes in a 200% float at 100° F. All percentages including those for floats are as percent by weight based on the shaved chrome stock leather weight. The pH of the liquor was 3.4. The liquor was drained off and the chrome stock floated in 200% water. ⅜ percent by weight of sodium bicarbonate was added to the drum in two feeds at twenty minute intervals. The pH of the liquor after bicarbonate addition was 4.1. The stock was then washed in a 200% float at 110° F. for ten minutes and drained. A 50% float containing 5% by weight of the 50% solution of Treating Agent D described in Part (A) of Example VI above was added. The leather was run for one hour at 110° F. The pH of the float was 4.4. The float was drained and a new 50% by weight float containing 5% by weight of a synthetic replacement tannin which was the condensation product of urea, formaldehyde and sulfonated cresol was added. This float was run for one hour at 110° F. During this period, the cationic Treating Agent D interreacted with the replacement tannin which was an anionic tanning agent. The drained chrome stock was then washed in a 200% float for five minutes at 120° F. The washed treated leather was then fat-liquored in a 100% float containing 5% sulfated vegetable and animal oils at 120° F. for forty-five minutes. After fat liquoring, the leather was drained, horsed and dried. The finished leather showed a tight grain effect and had excellent temper.

EXAMPLE VIII

Use of a treating agent in leather retanning 100 lbs. of shaved split chrome stock based on the chrome tanned split shaved weight was placed in a drum and wet back for thirty minutes with a 200% water float at 100° F. All percentages including those for floats are as percent by weight based on the shaved split chrome stock weight. The pH of the liquor was 4.2. After draining the liquor, the chrome stock was floated in 200% water. Then ⅜ percent by weight of sodium bicarbonate was added in one feed and the leather was run for thirty minutes. The pH of the liquor was 4.0. The stock was then washed in a 200% float at 110° F. for ten minutes and drained. A 50% by weight new float containing 10% by weight of the 33.33% solution of Treating Agent E described in Part (B) of Example VI above was then added. The float was run for one hour at 110° F. ⅜ percent by weight of formic acid was added to the float in one feed and run for fifteen minutes. The pH of the liquor was 3.6. The treated chrome stock was then washed with water for five minutes at 120° F. A 100% by weight float containing 5% sulfated vegetable and animal oils based on the weight of water was added and the retanned leather fat liquored for forty-five minutes at 120° F. After fat liquoring, the leather was drained, horsed up and dried. The finished leather showed tight grain and had excellent temper.

EXAMPLE IX

(A) Preparation of a Mannich Base compound

Into a glass lined kettle equipped with agiator, reflux conder and provisions for cooling and heating, a mixture of 34.00 lbs. (0.324 mole) of diethanolamine and 6.48 lbs. of methanol was introduced. The mixture cooled to about 10° C. and 26.38 lbs. (0.33 mole) of aqueous formaldehyde solution (37% by weight active) was then slowly added over one hour while the temperature was maintained at about 10° C. to about 15° C. A mixture of 30.44 lbs. (0.32 mole) of phenol and 2.70 lbs. of methanol at a temperature between about 20° C. and about 25° C. was added with continuous stirring. This addition was made as a single feed. Cooling was removed and the temperature of the reaction mixture was allowed to rise to about 20° C. to about 25° C. The reaction mixture was then heated to raise the temperature to about 60° C. to about 65° C. Approximately two hours was required to heat the reaction mixture to about 65° C. The reaction mixture was then vacuum distilled to remove water, methanol and other volatile materials. The temperature was gradually raised during vacuum distillation until a final temperature of about 105° C. was reached. The reaction mixture was heated at about 105° C. for about fifteen minutes and then cooled to room temperature. The reaction product was the desired Mannich Base compound and contained about 0.3% water by weight. The Mannich Base compound contained three hydroxyl groups, that is, one phenolic hydroxyl group and two alkanol hydroxyl groups.

(B) Preparation of a hydroxyl containing nitrogen compound 21.1 lbs. (0.1 mole) of the Mannich Base compound obtained in part (A) above was charged into a glass flask equipped with agitator, reflux condenser and provisions for maintaining a nitrogen blanket over the reactants and for external heating and cooling. The Mannich Base compound was heated with agitation to about 95° C. under a nitrogen blanket. 14.5 lbs. (0.25 mole) of propylene oxide was then gradually introduced under the nitrogen blanket and condensed with the Mannich Base compound at about 100° C. to about 120° C. The resulting hydroxyl containing nitrogen compound was the addition product of 2.5 moles of propylene oxide with one mole of the Mannich Base compound. The adduct contained three hydroxyl groups, that is, two alkanol groups and one hydroxyalkyl group wherein the three hydroxyl groups had been partially reacted with propylene oxide, PrO, that is 3OH/1.5 PrO.

EXAMPLE X (A) Preparation of an isocyanate terminated urethane prepolymer 1527 g. of a polypropylene glycol having an average molecular weight of 1025 and an average hydroxyl value of 110.2 was mixed with 522 g. of tolylene diisocyanate under a nitrogen blanket and heated with stirring to a temperature of about 65° C. An exothermic reaction occurred at about 65° C. and heating was discontinued. The temperature gradually rose to a temperature of about 75° C. during the exothermic reaction. The reaction mixture was heated with agitation at about 75° C. to about 80° C. for a period of one hour. After heating for one hour at about 80° C., the reaction product which was an isocyanate terminated urethane prepolymer was cooled to room temperature. Analysis showed that the reaction product had a reactive isocyanate content of 6.0% by weight.

(B) Preparation of a treating agent 338.7 g. of the isocyanate terminated urethane prepolymer obtained in part (A) above of this example and 163.5 g. of the hydroxyl containing nitrogen compound obtained in part (B) of Example I above were mixed under a nitrogen blanket in a flask and were heated to a temperature of about 70° C. The charge was then reacted under the nitrogen blanket at a temperature of about 70° C. to about 75° C. for ninety minutes to complete reaction. The reaction product was a treating agent, that is, a polyurethane resin. 188 g. of anhydrous isopropanol was added to the treating agent and the mixture stirred to obtain a uniform solution. The solution was then cooled to about 65° C. and 63 g. of dimethyl sulfate was added to the solution over a period of about two hours. The temperature during the dimethyl sulfate addition was maintained at a temperature of from about 65° C. to about 70° C. during the addition. The resulting reaction product was a quaternary ammonium derivative of the treating agent which was useful as a treating agent. The quaternary ammonium derivative was a water-soluble treating agent which exhibited strong cationic activity.

EXAMPLE XI

Preparation of a treating agent 677 g. of the isocyanate terminated urethane prepolymer obtained in part (A) of Example X above and 327 g. of the hydroxyl containing nitrogen compound obtained in part (B) of Example I above were mixed and reacted by the procedure described in part (B) of Example X above to obtain a treating agent which was a polyurethane resin. 200 g. of 1,4-dioxane was added to the resin and 60 g. of glacial acetic acid and 864 g. of water were then added to obtain a solution of the treating agent. The resulting solution contained a cationic salt of the treating agent which was soluble in water and exhibited strong cationic activity.

EXAMPLE XII (A) Preparation of an isocyanate terminated urethane prepolymer 874.8 g. of polypropylene glycol having an average molecular weight of 425 and an average hydroxyl value of 256.4 was mixed with 696 g. of tolylene diisocyanate under a nitrogen blanket. The resulting mixture was heated with stirring under the nitrogen blanket to a temperature of about 65° C. Heating was discontinued when the reaction temperature reached about 65° C. An exothermic reaction occurred at about 65° C. and the temperature gradually rose to a temperature of about 75° C. The reaction mixture was reacted at a temperature of about 75° C. to about 80° C. for one hour with stirring and heating. After this period, heating was discontinued and the reaction product which was an isocyanate terminated urethane prepolymer was cooled to room temperature. Analysis showed that the urethane prepolymer had a reactive isocyanate content of about 10.4% by weight.

(B) Preparation of a treating agent 403 g. of the isocyanate terminated urethane prepolymer obtained in part (A) above of this example was mixed under a nitrogen blanket with 327 g. of the hydroxyl containing nitrogen compound obtained in part (B) of Example I above. The mixture was then heated to about 70° C. and reacted at about 70° C. to about 75° C. under the nitrogen blanket with agitation for a period of about one hour. The resulting reaction product was a polyurethane resin which was useful as a treating agent. 60 g. of glacial acetic acid were added to the treating agent to obtain a solution which was then diluted with 790 g. of water. This solution of the treating agent contained a water-soluble cationic salt of the treating agent which exhibited strong cationic activity.

EXAMPLE XIII

Preparation of a treating agent 90.8 g. of the isocyanato terminated urethane prepolymer obtained in part (A) of Example XII and 65.4 g. of the hydroxyl containing nitrogen compound obtained in part (B) of Example I above were mixed under a nitrogen blanket in a flask and were heated with stirring to a temperature of about 65° C. to about 70° C. The mixture was reacted at this temperature for about one hour with stirring to obtain the treating agent which was a polyurethane resin. 150 g. of anhydrous isopropanol was added to the treating agent and the mixture stirred to obtain a uniform clear solution. The isopropanol solution was then heated to about 65° C. to about 70° C. with stirring and 25.2 g. of dimethyl sulfate was added over about one hour at this temperature. The resulting reaction product was a quaternary ammonium salt of the treating agent. The quaternary treating agent was water-soluble and exhibited strong cationic activity.

EXAMPLE XIV

Use of a treating agent in leather retanning 100 lbs. of shaved chrome leather stock based on the chrome tanned split shaved weight was put in a drum and wet back for thirty minutes in a 200% float at 100° F. All percentages including those for floats are as percent by weight based on the chrome tanned split shaved stock weight. The pH of the liquor was 3.5. The liquor was drained off and the stock floated in 100% water at 100° F. 1% by weight of sodium formate was added to the liquor in the drum and the stock was run for thirty minutes. The pH of the liquor was 3.9. The liquor was drained off. A 50% float containing 5% by weight of the quaternary treating agent described in part (B) of Example X above based on the chrome tanned split shaved weight was added to the stock in the drum. The stock was run in the drum for thirty minutes at 110° F. 5% by weight of a dry synthetic replacement tannin which was the condensation product of urea, formaldehyde and sulfonated cresol was added to the liquor in the drum and the drum was run for thirty minutes at 110° F. The pH of the liquor was 4.0. 0.5% by weight of formic acid was added in one feed to the liquor in the drum and the stock was run for fifteen minutes. The pH of the liquor was 3.4. The liquor was drained. The treated chrome stock was washed for five minutes at 120° F. in a 300% float and the liquor drained. A new 75% float was added to the treated chrome stock. 3% by weight of a fat liquor, which was a 90% active emulsifiable neatsfoot oil, and 0.1% Sterezol S Germicide (Wallerstein Co., Staten Island, N.Y.), which was a mixture of pine oil, cresols, orthophenylphenol, pentachlorophenol and betanaphthol, were added to the float. The retanned leather was treated with this float for thirty minutes at 120° F. The pH of the liquor was 3.8. After this final treatment, the stock was drained, horsed and dried. The finished leather had tight grain and excellent temper.

EXAMPLE XV

Use of a treating agent in leather retanning 100 lbs. of shaved chrome leather stock based on the chrome tanned split shaved weight was put in a drum and wet back for thirty minutes in a 200% float at 100° F. All percentages including those for floats are as percent by weight based on the chrome tanned split shaved stock weight. The pH of the liquor was 3.5. The liquor was drained off and the stock was floated in 100% water at 100° F. 1% by weight of sodium formate was added to the liquor in the drum and the stock was run for thirty minutes. The pH of the liquor was 3.9. The liquor was drained off. A 50% float containing 3% by weight of a fat liquor, which was a 80% active emulsifiable synthetic triglyceride, was added to the stock and the float run for thirty minutes at 110° F. The liquor was drained. A new 50% float containing 5% by weight of the quaternary treating agent described in Example XIII above based on the chrome tanned split shaved weight was added to the stock. The new float was run for thirty minutes at 110° F. and 5% by weight of dry synthetic replacement tannin, which was the condensation product of urea, formaldehyde and sulfonated cresol, was added to the float. This float was then run for one hour at 110° F. The pH of the liquor was 4.0. 0.5% by weight of formic acid was added in one feed to the liquor in the drum and the stock was run for fifteen minutes. The pH of the liquor was 3.3. The liquor was drained from the stock. The treated chrome stock was then washed for five minutes at 120° F. in a 300% float and the float drained. A new 75% float was added to the treated chrome stock. 3% by weight of a fat liquor, which was a 90% active emulsifiable neatsfoot oil, and 0.1% Sterezol S. Germicide (Wallerstein Co., Staten Island, N.Y.), which was a mixture of pine oil, cresols, orthophenylphenol, pentachlorophenol and betanaphthol, were added to the float. The retanned leather was treated with this float for thirty minutes at 120° F. The pH of the liquor was 3.8. After this final treatment, the stock was drained, horsed and dried. The finished leather had tight grain and excellent temper.

EXAMPLE XVI

Preparation of a treating agent and its use as an adhesive and bonding agent 450 g. of the hydroxyl containing nitrogen compound described in part (B) of Example IV above and 680 g. of the isocyanate terminated prepolymer described in part (A) of Example X above were reacted for about one hour at about 70° C. to about 75° C. under anhydrous conditions under a nitrogen blanket. The resulting reaction product was cooled to room temperature and thoroughly mixed with an additional 136 g. of the prepolymer described in part (A) of Example X above.

The resulting treating agent was applied to the surface of a wooden block. Then the surface of a second wooden block was applied to the coated surface of the first wooden block to form a laminate. The resulting laminate was cured at 325° F. for five minutes in an oven. The treating agent produced an excellent bond. The treating agent also gave excellent metal-to-wood and metal-to-metal bonds. The excellent bonds obtained with the treating agent were attributed to reaction of all of the hydroxyl groups present in the hydroxyl containing nitrogen compound with reactive isocyanate groups present in the prepolymer. Thus, this reaction resulted in high polymeric reaction products having excellent adhesive and bonding properties.

EXAMPLE XVII

Preparation of a treating agent and its use as a coating and impregnating agent for various substrates 450 g. of the hydroxyl containing nitrogen compound described in part (B) of Example IV above was dissolved in 500 g. of xylene. 680 g. of the isocyanate terminated prepolymer described in part (A) of Example X above was added to the xylene solution of the hydroxyl containing nitrogen compound. The resulting mixture was reacted for about one hour at about 70° C. to about 75° C. under anhydrous conditions and under a nitrogen blanket. The resulting reaction product was cooled to room temperature and designated as Component A.

A 50% by weight xylene solution of the prepolymer described in part (A) of Example X above was prepared by dissolving 272 g. of the prepolymer in xylene. This xylene solution was designated as Component B.

Component A and Component B were mixed together to obtain a solution of treating agent. It was found that the solution of treating agent was excellent for coating surfaces and impregnating substrates. The treating agent formed excellent coatings on metals and wood when it was applied and then cured for about five minutes at 325° F. in an oven. The coatings were flexible, durable and abrasion resistant. Likewise, the treating agent was excellent for impregnating substrates such as wood and fibers. The impregnated substrates were cured in the same manner as the coated substrates. When desired, lower curing temperatures such as 200° F. can be used provided longer curing times are employed, that is, ten minutes or more.

The treating agent solution had a shelf life of about seven hours at room temperature, that is, its properties as coating agent and impregnating agent were not adversely affected. When desired, pigments and/or dyes can be added to the treating agent solution.

The excellent coating and impregnating properties of the treating agent were attributed to reaction of all of the hydroxyl groups present in the hydroxyl containing nitrogen compound with reactive groups present in the prepolymer. This reaction results in high polymeric reaction products having excellent coating and impregnating properties. Such properties included abrasion resistance, high gloss, high solvent resistance and flexibility. This treating agent has excellent properties for use as a coating and impregnating agent for textile materials such as fibers, fabrics and the like.

EXAMPLE XVIII

Preparation of a treating agent and its use as a sealant and coating 340 g. of the Mannich Base compound described in part (A) of Example IV above and 300 g. of Shell diepoxide 828, which is the diglycidyl derivative of 4,4-dihydroxy-diphenyl-dimethyl methane, were mixed and heated with agitation for about one hour at about 95° C. to about 100° C. The reaction mixture was then heated to about 125° C. to about 130° C. and reacted within this temperature range for about 15 to about 20 minutes to produce a hydroxyl containing nitrogen compound. The resulting hydroxyl containing nitrogen compound was cooled to about 80° C. 500 g. of xylene was added to the compound and stirred to obtain a uniform clear solution.

670 g. of the isocyanate terminated urethane prepolymer described in part (A) of Example X above was added to the xylene solution of hydroxyl containing nitrogen compound. The resulting mixture was reacted at about 70° C. to about 75° C. for one hour under anhydrous conditions and under a nitrogen blanket. The resulting reaction product was designated as Component A.

267 g. of the isocyanate terminated urethane prepolymer described in part (A) of Example X above was dissolved in 267 g. of xylene. This solution was designated as Component B.

Component A and Component B were mixed to obtain a treating agent. The treating agent was allowed to react for about three hours at about 65° F. to cure. The cured product was a solid. When this treating agent was applied to a substrate (wood) and then cured and the solvent removed, the cured coatings were flexible, had good adhesion to the substrate and have abrasion resistance. If desired, dyes and/or pigments can be added to the treating agent to form colored or pigmented coatings.

Component A and Component B were also prepared without the use of solvents such as xylene. The components were heavy pastes. These two components were mixed at room temperature to obtain a treating agent. The treating agent was immediately applied as a sealant to a joint between two pieces of wood and cured at about 65° F. for about three hours. The cured seal was excellent. The treating agent was also an excellent sealant for metal-to-wood and metal-to-metal joints. The treating agent was also used as an adhesive for metal-to-metal, fiber-to-fiber and wood-to-wood bonds. It gave excellent results as an adhesive.

EXAMPLE XIX

Preparation of a treating agent and its use 344.2 g. of an isocyanate terminated urethane prepolymer described in part (A) of Example X above and 168.5 g. of the Mannich Base compound described in part (A) of Example IV above were reacted with constant agitation for about one hour at about 80° C. to about 90° C. under nitrogen and under anhydrous conditions to obtain a phenolic condensate.

201 g. of the above phenolic condensate and 76 g. of Shell diepoxide 828, which is the diglycidyl derivative of 4,4'-dihydroxy-diphenyl-dimethyl methane, were mixed and reacted with constant agitation for about one hour at about 95° C. to about 100° C. The reaction was completed by heating the reaction mixture to about 125° C. to about 130° C. and reacting the mixture within this temperature range for about 15 to about 20 minutes. The reaction product was then cooled to about 80° C. 277 g. of xylene was added to obtain 544 g. of the solution of the reaction product which was used below.

267.2 g. of the isocyanate terminated urethane prepolymer obtained in part (A) of Example X was dissolved in 267.2 g. of xylene to form a solution. 534 g. of this solution was added to 554 g. of the reaction product solution obtained above to obtain a treating agent. This treating agent was applied to substrates (wood and steel sheet) as coatings and the coatings cured at about 65° F. for about three hours. The treating agent produced cured coatings having excellent adhesion, abrasion resistance and flexibility. When desired, the treating agent was colored or tinted with dyestuffs and/or pigments to produce colored coatings.

The treating agent was also prepared in its solvent free form and evaluated as a sealant by the procedure given in Example XVIII above. The solvent free treating agent was an excellent sealant for metal-to-metal, wood-to-wood and metal-to-metal joints.

What is claimed is:
1. A treating agent which is the reaction product of:
    (A) the reaction product of
        (1) an hydroxyl containing nitrogen compound which is reaction product of
            (a) a Mannich Base compound which is the reaction product of (1) at least one phenol having at least one reactive hydrogen atom present in the phenol nucleus selected from the group consisting of alkyl phenols, polyphenyl phenols, phenols linked by alkylene bridges, and fused phenols; (2) at least one aldehyde selected from the group consisting of an aldehyde and an aldehyde liberating composition; and (3) at least one alkanolamine selected from the group consisting of monoalkanolamine and dialkanolamine wherein the alkeylene group of said alkanolamine has at least two carbon atoms said (2) and (3) being present in approximately equimolar amounts will respect to each other and being present in sufficient amounts to react with at least one reactive hydrogen atom in said phenol nucleus, there being present one mole of each of said (2) and (3) for each reacting reactive hydrogen atom, and
            (b) at least one mole of an alkylene oxide containing from 2 to 57 carbon atoms per phenolic hydroxyl group present in said Mannich Base compound, and
        (2) an isocyanate terminated urethane prepolymer which is the reaction product of an organic polyisocyanate and at least one member selected from the group consisting of a polyol, a polyether, and a polyester, having at least two terminal hydroxyl groups; and
    (B) a sufficient amount present to react with at least one nitrogen atom present in said (A) of a member of the group consisting of
        (i) at least one acid selected from the group consisting of hydrochloric acid, sulfuric acid, phosphoric acid, nitric acid, formic acid, acetic acid, propionic acid, butyric acid, isobutyric acid, succinic acid and maleic acid, and
        (ii) a quaternizing reagent selected from the group consisting of methyl chloride, methyl bromide, methyl iodide, ethyl chloride, benzyl chloride, and dimethyl sulfate.

2. A process for preparing a treating agent which comprises:
    (A) preparing a Mannich Base compound by reacting at about 50° C. to about 110° C.
        (1) one mole of at least one phenol having at least one reactive hydrogen atom present in the phenol nucleus selected from the group consisting of alkyl phenols, polyphenyl phenols, phenols linked by alkylene bridges, and fused phenols,
        (2) at least one aldehyde selected from the group consisting of an aldehyde and an aldehyde liberating composition, and
        (3) at least one alkanolamine selected from the group consisting of monoalkanolamine and dialkanolamine wherein the alkylene group of said alkanolamine has at least two carbon atoms
    said (2) and (3) being present in approximately equimolar amounts with respect to each other and being present in sufficient amounts to react with at least one reactive hydrogen atom in said phenol nucleus, there being present one mole of each of said (2) and (3) for each reacting reactive hydrogen atom; then
    (B) condensing together at about 30° C. to about 200° C. said Mannich Base compound and at least one mole of an alkylene oxide containing from 2 to 57 carbon atoms per phenolic hydroxyl group present in said Mannich Base compound; thereafter
    (C) reacting together at about 25° C. to about 160° C. said reaction product of (A) and (B) with an isocyanate terminated prepolymer which is the reaction product of an organic polyisocyanate and at least one member selected from the group consisting of a polyol, a polyether, and a polyester, having at least two terminal hydroxyl groups; and
(D) reacting at about 25° C. to about 150° C., with at least one nitrogen atom present in said reaction product of (A), (B) and (C), about one mole of a member of the group consisting of
  (i) at least one acid selected from the group consisting of hydrochloric acid, sulfuric acid, phosphoric acid, nitric acid, formic acid, acetic acid, propionic acid, butyric acid, isobutyric acid, succinic acid and maleic acid, and
  (ii) a quaternizing agent selected from the group consisting of methyl chloride, methyl bromide, methyl iodide, ethyl chloride, benzyl chloride, and dimethyl sulfate.

References Cited

UNITED STATES PATENTS

| | | | |
|---|---|---|---|
| 3,297,597 | 1/1967 | Edwards et al. | 260—2.5 |
| 3,395,129 | 7/1968 | Dieterich et al. | 260—77.5 |
| 3,436,373 | 4/1969 | Cox et al. | 260—51.5 |

HAROLD D. ANDERSON, Primary Examiner

L. L. LEE, Assistant Examiner

U.S. Cl. X.R.

117—124 E, 126 AB, 138.8 A, 138.8 D, 138.8 E, 138.8 F, 138.8 N, 138.8 UA, 141, 142, 145, 148, 155 R, 161 KP; 260—18 TN, 29.2 TN, 30.6 R, 30.8 R, 31.2 N, 33.4 UR, 33.6 UB, 33.8 UB, 51.5, 75 NQ, 77.5 AQ, 77.5 Q

PO-1050
(5/69)

UNITED STATES PATENT OFFICE
CERTIFICATE OF CORRECTION

Patent No. 3,655,619            Dated April 11, 1972

Inventor(s) Lucien Sellet

It is certified that error appears in the above-identified patent and that said Letters Patent are hereby corrected as shown below:

Column 2, lines 47-48, delete "hydrogen" (second occurrence). Column 6, line 38, change "the" to --three--. Column 9, line 38, change "type" to --types--; column 9, line 58, change "hydroxy" to --hydroxyl--. Column 10, line 24, change "hydroxy" to --hydroxyl--; column 10, line 25, change "hydroxy" to --hydroxyl--; column 10, line 70, delete "one" (second occurrence). Column 15, line 17, after "glycerol," insert --trimethylolethane--. Column 18, line 48, change "treatment" to --treating--; column 18, line 58, change "beu sed" to --be used--; column 18, line 61, after "jute," insert --sisal--. Column 19, line 47, change "weights" to --weight--. Column 22, line 11, change "had" to --has--; column 22, line 55, after "blanket" insert --and 58g. (1 mole) of propylene oxide was introduced under the nitrogen blanket--. Column 23, line 24, change "0.71%" to --0.17%--. Column 26, line 33, change "agiator" to --agitator--; column 26, line 34, change "conder" to --condenser--. Column 28, line 28, change "isocyanato" to --isocyanate--. Column 32, claim 1, line 9, change "alkeylene" to --alkylene--.

Signed and sealed this 29th day of May 1973.

(SEAL)
Attest:

EDWARD M. FLETCHER, JR.            ROBERT GOTTSCHALK
Attesting Officer                    Commissioner of Patents